(12) United States Patent
Yoneda

(10) Patent No.: US 6,788,848 B2
(45) Date of Patent: Sep. 7, 2004

(54) ARRAYED WAVEGUIDE GRATING DEVICE, PROCESS FOR PRODUCING THE SAME, ARRAYED WAVEGUIDE MODULE, AND OPTICAL COMMUNICATION SYSTEM

(75) Inventor: Shigeru Yoneda, Tokyo (JP)

(73) Assignee: NEC Corporation, Tokyo (JP)

( * ) Notice: Subject to any disclaimer, the term of this patent is extended or adjusted under 35 U.S.C. 154(b) by 195 days.

(21) Appl. No.: 09/950,706

(22) Filed: Sep. 13, 2001

(65) Prior Publication Data

US 2002/0044742 A1 Apr. 18, 2002

(30) Foreign Application Priority Data

Sep. 14, 2000 (JP) ........................................ 2000-279214

(51) Int. Cl.$^7$ .............................. G02B 6/34; G02B 6/36
(52) U.S. Cl. ......................................................... 385/37
(58) Field of Search ............................................ 385/37

(56) References Cited

U.S. PATENT DOCUMENTS

| | | | | |
|---|---|---|---|---|
| 6,222,653 | B1 * | 4/2001 | Asahi ........................ | 359/110 |
| 6,222,963 | B1 * | 4/2001 | Grand et al. .................. | 385/39 |
| 6,456,763 | B2 * | 9/2002 | Kashihara et al. ............ | 385/37 |
| 6,490,395 | B1 * | 12/2002 | Nara et al. .................... | 385/39 |
| 2002/0009263 | A1 * | 1/2002 | Kashihara et al. ............ | 385/37 |
| 2002/0025116 | A1 * | 2/2002 | Kashihara et al. ............ | 385/37 |

FOREIGN PATENT DOCUMENTS

| | | |
|---|---|---|
| JP | 04-86803 | 3/1992 |
| JP | 9-49936 | 2/1997 |
| JP | 09-289348 | 11/1997 |
| JP | 10-303815 | 11/1998 |
| JP | 11-163911 | 6/1999 |
| JP | 11-218639 | 8/1999 |

OTHER PUBLICATIONS

Japanese Office Action dated Apr. 30, 2003 with partial translation.
"Wavelength–Adaptable Optical Phased Array in SiO2–Si" Clements et al., IEEE, Photon, Tech., Lett., vol. 7, No. 10, pp. 1040–1041, 1995.
"The 2000 IEICE (The Institute of Electronics, Information and communication Engineers) General Conference, C–3–76," p. 256.
Japanese Office Action dated Feb. 10, 2004 with partial translation.

* cited by examiner

Primary Examiner—David V. Bruce
Assistant Examiner—Krystyna Suchecki
(74) Attorney, Agent, or Firm—McGinn & Gibb, PLLC

(57) ABSTRACT

In an arrayed waveguide grating device, two or three components are joined to each other in joint face in any one of or both an input-side slab waveguide and an output-side slab waveguide. In this case, the joint faces are joined to each other in such a state that the joint faces have been relatively moved by a desined degree. By virtue of this construction, an arrayed waveguide grating device, a process for producing the same, and an arrayed waveguide module and an optical communication system using the arrayed waveguide grating device can be realized wherein the joint faces can be fixed to each other at an optimal position to facilitate wavelength correction and the third component for constituting the output-side slab waveguide can be properly selected and joined, for example, to realize increase the number of output-side channels or to provide a monitoring output terminal.

15 Claims, 27 Drawing Sheets

① : COMPONENT 1

- 141 1ST COMPONENT
- 65 FIBER ARRAY
- 151 REGION AROUND END FACE OF INPUT-SIDE SLAB WAVEGUIDE
- 74 INPUT WAVEGUIDES

- 69A₁ INPUT-SIDE SLAB WAVEGUIDE
- 74A₁ INPUT WAVEGUIDES

OPTICAL OUTPUT

69A₂ INPUT-SIDE SLAB WAVEGUIDE

74A₂ INPUT WAVEGUIDES (16 CHANNELS)

(INCREASED WAVELENGTH SPACING)

(32 CHANNELS)

(PROVIDED WITH OUTPUT MONITOR WAVEGUIDE)

(16 CHANNELS)

(INCREASED WAVELENGTH SPACING)

(32 CHANNELS)

$\lambda_1, \lambda_2, \lambda_3, \lambda_4, \lambda_5, \lambda_6, \lambda_7 \cdots \lambda_{30}, \lambda_{31}, \lambda_{32}$ : WAVELENGTH (PROVIDED WITH OUTPUT MONITOR WAVEGUIDE)

$75B_4, 75B_5, 75B_6$ : OUTPUT WAVEGUIDES

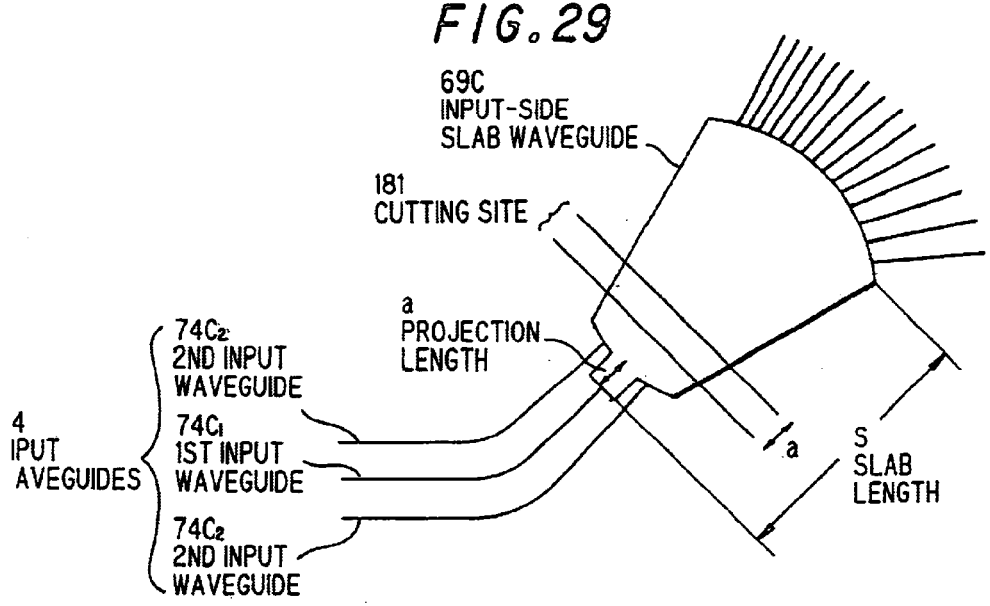
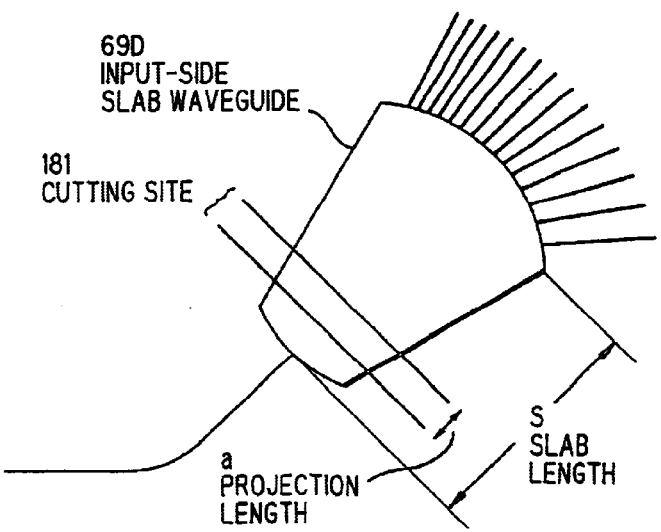

ARRAYED WAVEGUIDE GRATING DEVICE, PROCESS FOR PRODUCING THE SAME, ARRAYED WAVEGUIDE MODULE, AND OPTICAL COMMUNICATION SYSTEM

FIELD OF THE INVENTION

The invention relates to an arrayed waveguide grating device, a process for producing the same, an arrayed waveguide module, and an optical communication system. More particularly, the invention relates to an arrayed waveguide grating device, which can correct the wavelength to be selected, a process for producing the same, and an arrayed waveguide module and an optical communication system using said arrayed waveguide grating device.

BACKGROUND OF THE INVENTION

An increase in capacity of data to be transmitted has led to a demand for further increased transmission capacity in an optical fiber communication system. For this reason, optical wavelength filters are becoming increasingly important as multiplexing/demultiplexing devices for dividing or multiplexing wavelengths by dense wavelength division multiplexing (DWDM).

There are various types of optical wavelength filters. Among others, arrayed waveguide gratings have a high extinction ratio in narrow band wavelength characteristics and can also function as a multi-input/multi-output filter device. Therefore, the separation of multiplexed signals and the multiplexing of separated signals are possible, and, thus, advantageously, a wavelength multiplexing/demultiplexing device can be easily constructed. Further, when an arrayed waveguide grating device is constructed by a quartz waveguide, the efficiency of coupling to optical fibers is high and low insertion loss operation with an insertion loss of about several dB (decibels) can be realized. By virtue of this, arrayed waveguide gratings have drawn attention as a particularly important device among the optical wavelength filters, and have been energetically studied in Japan and other countries.

FIG. 1 shows the whole construction of a conventional arrayed waveguide grating. An arrayed waveguide grating 11 comprises: a single or plurality of input waveguides 12 provided on a substrate (not shown); a plurality of output waveguides 13; a channel waveguide array 14 of channel waveguides bent in a certain direction with respectively different curvatures; an input-side slab waveguide 15 for connecting the input waveguides 12 to the channel waveguide array 14; and an output-side slab waveguide 16 for connecting the channel waveguide array 14 to the output waveguides 13. The course of multiplexed signal lights introduced through the input waveguides 12 is widen by the input-side slab waveguide 15, and the multiplexed signal lights are incident as equal phases on the channel waveguide array 14. The incident light intensity varies depending upon incident positions of the input-side slab waveguide 15. Specifically, the closer the incident position to the center portion, the higher the intensity The intensity distribution is substantially a Gaussian distribution.

In the channel waveguide array 14, a certain optical path difference is provided among the arrayed waveguides constituting the channel waveguide array 14. The optical path lengths are set so as to be successively increased or decreased. Therefore, a phase difference is provided at certain spacings in the lights guided through the arrayed waveguides, and, in this state, the lights reach the output-side slab waveguide 16. In fact, due to wavelength dispersion, the equal phase face is inclined according to the wavelength. As a result, light image formation (focusing) take place at different positions at the interface of the output-side slab waveguide 16 and the output waveguides 13 according to wavelengths. Since the output waveguides 13 are disposed at positions corresponding respectively to the wavelengths, desired wavelength components can be taken out of the output waveguides 13.

The center wavelength of this type of arrayed waveguide grating 11 is very sensitive to a change in refractive index of the waveguide material. Therefore, a variation in the film formation process as the production process leads to a change in the center wavelength, This in many cases makes it impossible to obtain values as designed. The change in center wavelength poses a problem that optical loss at the wavelength used is increased.

In order to overcome this problem, Japanese Patent Laid-Open No. 49936/1997 proposes the provision of I/O (input/output) waveguides for wavelength correction in addition to I/O waveguides of conventional AWGs (arrayed waveguides). In this case, the I/O waveguides are changed according to the correction level of the wavelength.

When the difference in the accuracy of the demultiplexing direction relative to the wavelength difference δλ is δθ, in the arrayed waveguide grating, the center wavelength $\lambda_{in}$ can be corrected by a value represented by equation (1) by changing the position of the input waveguides 12, that is, changing the angle $\theta_{in}$ of incidence on the slab.

$$\delta\lambda_{in} = \frac{\delta\lambda}{\delta\theta} \cdot \theta_{in} \qquad (1)$$

Since, however, the I/O waveguides for wavelength correction are discretely disposed, the degree of correction for the wavelengths is also discrete and, thus, the wavelength cannot be corrected as desired. To provide the degree of wavelength correction as desired, the angle $\theta_{in}$ of incidence on the slab should be arbitrary.

FIG. 2 shows the construction of an arrayed waveguide grating device for solving the above problem. For example, in this proposal described in "P. CPU. Clements et al., IEEE, Photon, Tech., Lett., Vol. 7, No. 10, pp. 1040–1041, 1995," the substrate is cut at the section 22 of incidence on the slab on the input side of AWG (arrayed waveguides) wafer 21. In the section 22, of incidence on the slab, reinforced with a dolly (glass), an input fiber 24, which is likewise sandwiched by the dolly 23, is bonded (fixed). At the time of the bonding, aligning is directly carried out, and the position of the input fiber 24 is changed as desired according to the degree of wavelength correction.

In general, however, the production error of the input fiber 24 having a spot size is much larger than that of the optical waveguides having a spot size. Therefore, the adoption of this technique raises a problem that a large variation in spot size of the input fiber 24 is causative of a deterioration in characteristics of the arrayed waveguides.

FIG. 3 shows a proposal for solving the above problem. For example, in "THE 2000 IEICE (The Institute of Electronics, Information and Communication Engineers) GENERAL CONFERENCE, C-3-76," as shown in FIG. 3, the input fiber 31 is connected to the input-side slab waveguide 33 through an optical waveguide 32 for introduction into the slab, rather than bonding of the input fiber 24 at the section 22 of incidence on the slab. Both the input-side slab waveguide 33 and the output-side slab waveguide 34 are provided on an AWG device wafer 35, and a channel waveguides array 36 is provided between and connected to the input-side slab waveguide 33 and the output-side slab waveguide 34. Further, output waveguides 38 are provided between and connected to the output-side slab waveguide 34 and the fiber array 37.

In the case of the arrayed waveguide grating device shown in FIG. 3, the optical waveguide 32 for introduction into the slab is provided between the input fiber 31 and the input-side slab waveguide 33. In this case, waveguides are connected to the input-side slab waveguide 33, and, thus, the problem of a variation in spot size as described above is reduced. Since, however, the optical waveguide 32 for introduction into the slab should be separately provided, this may be an obstacle to mass production.

In the methods shown in FIGS. 2 and 3, the incident section of the slab is cut. Therefore, the generation of an error in the optical axis direction at the slab cut position causes a change in slab length which is causative of a deterioration in wavelength characteristics. Specifically, when the slab has been cut in a larger length than the necessary length, the length can be regulated, for example, by grinding. On the other hand, when the slab length is shorter than the necessary length, the correction per se is impossible.

Further, when module packaging of the device is taken into consideration, the input fiber is preferably parallel to the output fiber. As shown in FIGS. 2 and 3, in order to render the input fiber and the output fiber parallel to each other, the chip layout within the AWG wafer should be changed from a simple one. This is a factor which limits the chip layout within the wafer.

FIG. 4 shows an example of biconnected arrayed waveguides. This construction can be adopted when there is no limitation on chip layout within the wafer. In this drawing, in order to enhance the yield of the arrayed waveguide per wafer to increase the harvest, AWG slabs 41, 42 cross each other, and AWG slabs 43, 44 cross each other to dispose arrayed waveguides 45, 46 in a biconnected form. In this chip layout within the wafer, the yield can be enhanced by selecting an arrayed waveguide having better characteristics from the two arrayed waveguides 45, 46.

In FIG. 4, because, for example, vertically symmetrical arrangement is possible, the AWG slabs 41, 42 can be disposed so as to cross each other while disposing the AWG slabs 43, 44 so as to cross each other, whereby arrayed waveguides 45, 46 are disposed in a biconnected form. On the other hand, the arrayed waveguides in a form as shown in FIGS. 2 and 3 cannot be disposed in a biconnected form without difficulty.

As described above, the conventional arrayed waveguide grating device constructed so as to correct the center wavelength poses problems, for example, a deterioration in characteristics of arrayed waveguides due to a spot size error, the time or labor for providing a specialty wave guide, and the limitation of chip layout.

Although the problems of the arrayed waveguide grating device have been described above, the same problems as involved in the arrayed waveguide grating device are also found in arrayed waveguide modules and optical communication systems using the arrayed waveguide grating device.

SUMMARY OF THE INVENTION

Accordingly, it is an object of the invention to provide an arrayed waveguide grating device, which can easily realize wavelength correction, a process for producing the same, and an arrayed waveguide module and an optical communication systems using said arrayed waveguide grating device.

According to the first feature of the invention, an arrayed waveguide grating device comprises: (i) a single or plurality of input waveguides provided on a first substrate; (ii) a first input-side slab waveguide which is connected to the input waveguide and is in such a form that a slab waveguide provided on the first substrate has been cut together with the first substrate at a predetermined position and the first half portion on the first substrate side has been left; (iii) a second input-side slab waveguide which is in such a form that a slab waveguide, identical to said slab waveguide, provided on a second substrate, which is the same or different from the first substrate, has been cut together with the second substrate at said predetermined position and the second half portion on the second substrate side has been left, said second input-side slab waveguide being fixed to the first input-side slab waveguide in such a state that the cut face of the second input-side slab waveguide and the cut face of the first input-side slab waveguide have been relatively moved by a desired degree according to need; (iv) a channel waveguide array which is provided on the second substrate so as for waveguides constituting the channel waveguide array to respectively have successively increased lengths in a predetermined waveguide length increment and is connected to the second input-side slab waveguide; (v) an output waveguide provided on the second substrate; and (vi) an output-side slab waveguide which is provided on the second substrate and connects the channel waveguide array to the output waveguide.

According to the first feature of the invention, an input-side slab waveguide provided on an identical substrate is cut into a first input-side slab waveguide and a second input-side slab waveguide which are fixed to each other in such a state that the cut faces have been relatively moved by a desired degree, thereby realizing an arrayed waveguide grating device. Alternatively, a first input-side slab waveguide and a second input-side slab waveguide, each having such a structure that has been formed by the above cutting, are prepared on an identical substrate or respective separate substrates, and the end faces, in the structure such that has been formed by cutting, are fixed to each other in such a state that the cut faces have been relatively moved by a desired degree according to need, thereby realizing an arrayed waveguide grating device. The fixation of the cut or end faces to each other, in such a state that the cut or end faces have been relatively moved by a desired degree in an analog manner, can realize wavelength correction on the input side with high accuracy. Further, since two components are fixed to each other to constitute one arrayed waveguide grating device, the yield can be improved as compared with the case where the arrayed waveguide grating device is produced as a single component.

According to the second feature of the invention, an arrayed waveguide grating device comprises: (i) an input waveguide provided on a first substrate; (ii) a channel waveguide array which is provided on the first substrate constructed so as for waveguides constituting the channel waveguide array to respectively have successively increased lengths in a predetermined waveguide length increment; (iii) an input-side slab waveguide which is provided on the first substrate and connects the input waveguide to the channel waveguide array; (iv) a first output-side slab waveguide which is in such a form that a slab waveguide provided on the first substrate and connected to the channel waveguide array has been cut together with the first substrate at a predetermined position and the first half portion on the first substrate side has been left: (v) a second output-side slab waveguide which is in such a form that a slab waveguide, identical to said slab waveguide, provided on a second substrate, which is the same or different from the first substrate, has been cut together with the second substrate at said predetermined position and the second half portion on the second substrate side has been left, said second output-side slab waveguide being fixed to the first output-side slab waveguide in such a state that the cut face of the second output-side slab waveguide and the cut face of the first output-side slab waveguide have been relatively moved by a desired degree according to need; and (vi) a plurality of output waveguides which are provided on the second substrate and are connected to the second output-side slab waveguide.

According to the second feature of the invention, an output-side slab waveguide provided on an identical substrate is cut into a first output-side slab waveguide and a second output-side slab waveguide which are fixed to each other in such a state that the cut faces have been relatively moved by a desired degree, thereby realizing an arrayed waveguide grating device. Alternatively, a first output-side slab waveguide and a second output-side slab waveguide, each having such a structure that has been formed by the above cutting, are prepared on an identical substrate or respective separate substrates, and the end faces, in the structure such that has been formed by cutting, are fixed to each other in such a state that the cut faces have been relatively moved by a desired degree according to need, thereby realizing an arrayed waveguide grating device. The fixation of the cut or end faces to each other, in such a state that the cut or end faces have been relatively moved by a desired degree in an analog manner, can realize wavelength correction on the output side with high accuracy. Further, the selection of various output-side slab waveguides can realize, for example, a change in the number of channels on the output side. Furthermore, since two components are fixed to each other to constitute one arrayed waveguide grating device, the yield can be improved as compared with the case where the arrayed waveguide grating device is produced as a single component.

According to the third feature of the invention, an arrayed waveguide grating device comprising: (i) a single or plurality of input waveguides provided on a first substrate; (ii) a first input-side slab waveguide which is connected to the input waveguide and is in such a form that an input-side slab waveguide provided on the first substrate has been cut together with the first substrate at a predetermined position and the first half portion on the first substrate side has been left; (iii) a second input-side slab waveguide which is in such a form that a slab waveguide, identical to said input-side slab waveguide, provided on a second substrate, which is the same or different from the first substrate, has been cut together with the second substrate at said predetermined position and the second half portion on the second substrate side has been left, said second input-side slab waveguide being fixed to the first input-side slab waveguide in such a state that the cut face of the second input-side slab waveguide and the cut face of the first input-side slab waveguide have been relatively moved by a desired degree according to need; (iv) a channel waveguide array which is provided on the second substrate so as for waveguides constituting the channel waveguide array to respectively have successively increased lengths in a predetermined waveguide length increment and is connected to the second input-side slab waveguide; (v) a first output-side slab waveguide which is in such a form that an output-side slab waveguide provided on the second substrate and connected to the channel waveguide array has been cut together with the second substrate at other predetermined position different from said predetermined position and the first half portion on the second substrate side has been left; (vi) a second output-side slab waveguide which is in such a form that a slab waveguide, identical to said output-side slab waveguide, provided on a third substrate, which is the same or different from the second substrate, has been cut together with the third substrate at said other predetermined position and the second half portion on the third substrate side has been left, said second output-side slab waveguide being fixed to the first output-side slab waveguide in such a state that the cut face of the second output-side slab waveguide and the cut face of the first output-side slab waveguide have been relatively moved by a desired degree according to need; and (vii) a plurality of output waveguides which are provided on the third substrate and are connected to the second output-side slab waveguide.

The third feature of the invention comprises a combination of the first feature of the invention, wherein the arrayed waveguide grating device comprises two components divided at the input-side slab waveguide, with the second feature of the invention wherein the arrayed waveguide grating device comprises two components divided at the output-side slab waveguide. That is, the arrayed waveguide grating device according to the third feature of the invention comprises three components in total divided at the input-side slab waveguide and the output-side slab waveguide. These components are fixed to one another in such a manner that the end faces, in such a structure that has been formed by cutting, have been moved by a desired degree according to need, thereby realizing an arrayed waveguide grating device. Therefore, the fixation, in such a state that the end faces in one of or both the two fixation sites have been moved by a desired degree in an analog manner, can realize wavelength correction with high accuracy. Further, the selection of various output-side slab waveguides can realize, for example, a change in the number of output-side ports. Furthermore, since three components are fixed to one another to constitute one arrayed waveguide grating device, the yield can be improved as compared with the case where the arrayed waveguide grating device is produced as a single component. In addition, since the second substrate constituting the channel waveguide array disposed between the input-side slab waveguide and the output-side slab waveguide is required to have higher accuracy than the other substrates, an improvement in yield and a reduction in cost can be realized, for example, by producing only the second substrate according to a production process having high accuracy, producing the first and third substrates according to a production process having relatively low accuracy, and combining these three substrates to constitute one arrayed waveguide grating device.

In arrayed waveguide grating devices according to the first to third features of the invention, the cut site may be a face which has been slightly deviated in a predetermined direction on a three-dimensional space from a face perpendicular to the optical axis.

According to this construction, since the reflecting face is not a face perpendicular to the optical axis, the adverse effect of reflection can be eliminated. Rendering the direction slightly different in a predetermined direction on a three-dimensional space, of course, embraces slight deviation in a two-dimensional direction and hence does not necessarily mean that a three-dimensional direction should be taken.

Further, in arrayed waveguide grating devices according to the first to third features of the invention, preferably the cut site has been reinforced with a dolly.

According to this construction, the use of the reinforcing dolly (glass) can facilitate cutting, polishing, and fixation and, in addition, can maintain the strength after the fixation. It is a matter of course that there is no limitation on the material and the type in the reinforcing member.

In the arrayed waveguide grating device according to the first or second feature of the invention, preferably, the first and second substrates are formed of a material transparent to ultraviolet light.

When an UV-curable resin is used as an adhesive for the fixation, the use of a transparent device substrate material, such as a quartz substrate, that is, a device substrate material having high ultraviolet light transmission, is preferred from the viewpoint of production in consideration of ultraviolet light transmission.

In the arrayed waveguide grating device according to the third feature of the invention, preferably, the first to third substrates are formed of a material transparent to ultraviolet light.

When an UV-curable resin is used as the adhesive, the use of a transparent device substrate material, such as a quartz substrate, that is, a device substrate material having high ultraviolet light transmission, is preferred from the viewpoint of production in consideration of ultraviolet light transmission.

According to the fourth feature of the invention, a process for producing an arrayed waveguide grating device, comprises the steps of: (i) forming, on one substrate, a single or plurality of input waveguides, a plurality of output waveguides, a channel waveguide array constructed so as for waveguides constituting the channel waveguide array to respectively have successively increased lengths in a predetermined waveguide length increment, an input-side slab waveguide for connecting the input waveguide to the channel waveguide array, and an output-side slab waveguide for connecting the output waveguide to the channel waveguide array, to produce an arrayed waveguide grating device (arrayed waveguide grating device production step); (ii) cutting the input-side slab waveguide, in the arrayed waveguide grating device produced in the arrayed waveguide grating device production step, integrally with the substrate in a predetermined direction (cutting step); and (iii) fixing the cut faces produced by the cutting step to each other in such a state that the cut faces have been relatively moved in a cut direction by a desired degree (fixation step).

In the production process according to the fourth feature of the invention, the arrayed waveguide grating device according to the first feature of the invention is produced using an identical substrate.

According to the fifth feature of the invention, a process for producing an arrayed waveguide grating device, comprises the steps of: (i) forming, on one substrate, a single or plurality of input waveguides, a plurality of output waveguides, a channel waveguide array constructed so as for waveguides constituting the channel waveguide array to respectively have successively increased lengths in a predetermined waveguide length increment, an input-side slab waveguide for connecting the input waveguide to the channel waveguide array, and an output-side slab waveguide for connecting the output waveguide to the channel waveguide array, to produce an arrayed waveguide grating device (arrayed waveguide grating device production step); (ii) cutting the output-side slab waveguide, in the arrayed waveguide grating device produced in the arrayed waveguide grating device production step, integrally with the substrate in a predetermined direction (cutting step): and (iii) fixing the cut faces produced by the cutting step to each other in such a state that the cut faces have been relatively moved in a cut direction by a desired degree (fixation step).

In the production process according to the fifth feature of the invention, the arrayed waveguide grating device according to the second feature of the invention is produced using an identical substrate.

According to the sixth feature of the invention, a process for producing an arrayed waveguide grating device, comprising the steps of: (i) producing a plurality of arrayed waveguide grating devices, each of the plurality of arrayed waveguide grating devices having been produced by forming, on one substrate, a single or plurality of input waveguides, a plurality of output waveguides, a channel waveguide array constructed so as for waveguides constituting the channel waveguide array to respectively have successively increased lengths in a predetermined waveguide length increment, an input-side slab waveguide for connecting the input waveguide to the channel waveguide array, and an output-side slab waveguide for connecting the output waveguide to the channel waveguide array (arrayed waveguide grating device production step); (ii) cutting the input-side slab waveguide, in each of the plurality of arrayed waveguide grating devices produced in the arrayed waveguide grating device production step, integrally with the substrate in a predetermined direction (cutting step), into a component having a first cut face and a component having a second cut face; and (iii) selecting a desired combination of a component having a first cut face and a component having a second cut face from the components having a first cut face and the components having a second cut face obtained in the cutting step, and fixing the cut faces of the selected components to each other in such a state that the cut faces have been relatively moved in a cut direction by a desired degree (fixation step).

In the production process according to the sixth feature of the invention, a plurality of substrates, in such a form that an input-side slab waveguide has been divided into a plurality of parts, are previously prepared and are used in proper combination to produce a desired arrayed waveguide grating device.

According to the seventh feature of the invention, a process for producing an arrayed waveguide grating device, comprising the steps of: (i) producing a plurality of arrayed waveguide grating devices, each of the plurality of arrayed waveguide grating devices having been produced by forming, on one substrate, a single or plurality of input waveguides, a plurality of output waveguides, a channel waveguide array constructed so as for waveguides constituting the channel waveguide array to respectively have successively increased lengths in a predetermined waveguide length increment, an input-side slab waveguide for connecting the input waveguide to the channel waveguide array, and an output-side slab waveguide for connecting the output waveguide to the channel waveguide array (arrayed waveguide grating device production step); (ii) cutting the output-side slab waveguide, in each of the plurality of arrayed waveguide grating devices produced in the arrayed waveguide grating device production step, integrally with the substrate in a predetermined direction, into a component having a first cut face and a component having a second cut face (cutting step); and (iii) selecting a desired combination of a component having a first cut face and a component having a second cut face from the components having a first cut face and the components having a second cut face obtained in the cutting step, and fixing the cut faces of the selected components to each other in such a state that the cut faces have been relatively moved in a out direction by a desired degree (fixation step).

In the production process according to the seventh feature of the invention, a plurality of substrates, in such a form that an output-side slab waveguide has been divided into a plurality of parts, are previously prepared and are used in proper combination to produce a desired arrayed waveguide grating device.

In the arrayed waveguide grating device according to the second or third feature of the invention, preferably, the second output-side slab waveguide is selectable as desired from second output-side slab waveguides which are different from each other in the number of output waveguides connected thereto, According to this construction, in connecting the cut second output-side slab waveguide to the first output-side slab waveguide, when a plurality of second output-side slab waveguides different from each other in the number of output waveguides connected thereto are provided, a desired number of ports can be selected therefrom. In this case, the invention can be used for purposes other than the wavelength correction.

In the arrayed waveguide grating device according to the second or third feature of the invention, preferably, the second output-side slab waveguide is constructed as a second output-side slab waveguide such that at least one of output waveguides connected thereto is allocated to a port for monitoring.

According to this construction, in connecting the cut second output-side slab waveguide to the first output-side slab waveguide, when a second output-side slab waveguide, such that at least one of output waveguides connected thereto is allocated to a port for monitoring, is provided, the selection of this output-side slab waveguide permits the invention to be used for purposes other than the wavelength correction.

In the arrayed waveguide grating device according to the first or third feature of the invention, preferably, a plurality of the first substrates, which are different from each other in a part or the whole of the shape of connection of the input waveguide to the first input-side slab waveguide, are provided for selective connection to the second substrate.

According to this construction, a plurality of the first substrates are provided which are different from each other in a part or the whole of the shape of connection of the input waveguide to the first input-side slab waveguide such that the connection has a widened or narrowed shape. In this case, for example, various spectral forms can be selected. Therefore, one substrate can be selected from the plurality of the first substrates and connected to the second substrate to constitute an arrayed waveguide grating device having desired characteristics.

In arrayed waveguide grating device according to the second feature of the invention, a plurality of the second substrates, which are different from each other in a part or the whole of the shape of connection of the output waveguide to the second output-side slab waveguide, are provided for selective connection to the first substrate.

According to this construction, a plurality of the second substrates are provided which are different from each other in a part or the whole of the shape of connection of the output waveguide to the second output-side slab waveguide such that the connection has a widened or narrowed shape.

In this case, for example, various spectral forms can be selected. Therefore, one substrate can be selected from the plurality of second substrates and connected to the first substrate to constitute an arrayed waveguide grating device having desired characteristics.

In the arrayed waveguide grating device according to the third feature of the invention, a plurality of the third substrates, which are different from each other in a part or the whole of the shape of connection of the output waveguide to the second output-side slab waveguide, are provided for selective connection to the second substrate.

According to this construction, a plurality of the third substrates are provided which are different from each other in a part or the whole of the shape of connection of the output waveguide to the second output-side slab waveguide such that the connection has a widened or narrowed shape. In this case, for example, various spectral forms can be selected. Therefore, one substrate can be selected from the plurality of third substrates and connected to the second substrate to constitute an arrayed waveguide grating device having desired characteristics.

In the arrayed waveguide grating device according to the first or third feature of the invention, a monitoring input waveguide used for monitoring an output before cutting the input-side slab waveguide into the first input-side slab waveguide and the second input-side slab waveguide is adjacent to the input waveguide and connected to the first input-side slab waveguide and the input waveguide portion other than the monitoring input waveguide is projected toward the input side by a length corresponding to a reduction in the slab length upon cutting of the slab waveguide into the first input-side slab waveguide and the second input-side slab waveguide or polishing of the cut faces.

According to this construction, before cutting, the device can be examined with high accuracy. When the input-side slab waveguide is cut, the length of the slab is reduced at the time of cutting or polishing. In consideration of this, the use of a longer slab length than usual makes it impossible to accurately examine the device before cutting by introducing light into the input-side slab waveguide, due to the long slab length. To overcome this problem, a monitoring input waveguide is previously connected to the slab waveguide in its site having an ordinary slab length. In order to ensure this slab length after cutting, regarding the main input waveguide portion (the input waveguide portion other than the monitoring input waveguide), is projected toward the input side so as to have a slab length which is larger by a length corresponding to a reduction in the slab length upon cutting.

In the embodiment of the arrayed waveguide grating device according to the second or third feature of the invention wherein a second output-side slab waveguide, such that at least one of output waveguides connected thereto is allocated to a port for monitoring, is provided, the monitoring port may be a spectral monitoring port which provides an optical signal of a more steep spectrum than other port connected to the second output-side slab waveguide.

According to this construction, when a port, which provides an optical signal of a more steep spectrum than other port connected to the second output-side slab waveguide, is provided as the spectral monitoring port, the accuracy of the positional correction can be satisfactorily improved, for example, at the time of the fixation of the cutting site of the slab waveguide.

In the embodiment of the arrayed waveguide grating device according to the second or third feature of the invention wherein a second output-side slab waveguide, such that at least one of output waveguides connected thereto is allocated to a port for monitoring, is provided, the monitoring port may be a power monitoring port which obtains an optical signal corresponding a specific port connected to the second output-side slab waveguide to detect the power of the specific port.

According to this construction, the provision of a power monitoring port corresponding to a specific port can realize power monitoring, for example, when measurement with the specific port is impossible.

According to the eighth feature of the invention, an arrayed waveguide grating device comprises: (i) a first substrate on which a single or plurality of input waveguides and a first input-side slab waveguide connected to the input waveguide are disposed and which has a first end face in a region where the input-side slab waveguide has been disposed; and (ii) a second substrate on which a second input-side slab waveguide, a channel waveguide array constructed so as for waveguides constituting the channel waveguide array to respectively have successively increased lengths in a predetermined waveguide length increment and connected to the input-side slab waveguide, a plurality of output waveguides, and an output-side slab waveguide for connecting the channel waveguide array to the output waveguide are disposed and which has an end face in a region where the second slab waveguide has been disposed, (iii) said first end face having been fixed to said second end face so that light, which has emerged from the input-side waveguide and entered the first input-side slab waveguide, is optically coupled to the channel waveguide array through the second slab waveguide.

According to this construction, the first end face of the first substrate has been fixed to the second end face of the second substrate so that light, which has emerged from the input-side waveguide and entered the first input-side slab waveguide, is optically coupled to the channel waveguide array through the second slab waveguide. The fixation of these end faces, in such a state that the end faces have been moved according to need, can realize wavelength correction on the input side with high accuracy. Further, since two components are fixed to each other to constitute one arrayed waveguide grating device, the yield can be improved as compared with the arrayed waveguide grating device is produced as a single component.

According to the ninth feature of the invention, an arrayed waveguide module comprises: (i) an arrayed waveguide grating device comprising a single or plurality of input waveguides provided on a first substrate, a first input-side slab waveguide which is connected to the input waveguide and is in such a form that a slab waveguide provided on the first substrate has been cut together with the first substrate at a predetermined position and the first half portion on the first substrate side has been left, a second input-side slab waveguide which is in such a form that a slab waveguide, identical to said slab waveguide, provided on a second substrate, which is the same or different from the first substrate, has been cut together with the second substrate at said predetermined position and the second half portion on the second substrate side has been left, said second input-side slab waveguide being fixed to the first input-side slab waveguide in such a state that the cut face of the second input-side slab waveguide and the cut face of the first input-side slab waveguide have been relatively moved by a desired degree according to need, a channel waveguide array which is provided on the second substrate so as for waveguides constituting the channel waveguide array to respectively have successively increased lengths in a predetermined waveguide length increment and is connected to the second input-side slab waveguide, an output waveguide provided on the second substrate, and an output-side slab waveguide which is provided on the second substrate and connects the channel waveguide array to the output waveguide; (ii) an input optical fiber optically connected to the input waveguide; and (iii) an output optical fiber optically connected to the output waveguide.

The ninth feature of the invention provides an arrayed waveguide module using the arrayed waveguide grating device according to the first feature of the invention. According to the construction of the ninth feature of the invention, the wavelength correction on the input side can be carried out with high accuracy. Further, since two components are fixed to each other to constitute one arrayed waveguide grating device, the yield can be improved as compared with the arrayed waveguide grating device is produced as a single component.

According to the tenth feature of the invention, an arrayed waveguide module comprises: (i) an arrayed waveguide grating device comprising a first substrate on which a single or plurality of input waveguides and a first input-side slab waveguide connected to the input waveguide are disposed and which has a first end face in a region where the input-side slab waveguide has been disposed, and a second substrate on which a second input-side slab waveguide, a channel waveguide array constructed so as for waveguides constituting the channel waveguide array to respectively have successively increased lengths in a predetermined waveguide length increment and connected to the input-side slab waveguide, a plurality of output waveguides, and an output-side slab waveguide for connecting the channel waveguide array to the output waveguide are disposed and which has an end face in a region where the second slab waveguide has been disposed, said first end face having been fixed to said second end face so that light, which has emerged from the input-side waveguide and entered the first input-side slab waveguide, is optically coupled to the channel waveguide array through the second slab waveguide; (ii) an input optical fiber optically connected to the input waveguide; and (iii) an output optical fiber optically connected to the output waveguide.

The tenth feature of the invention provides an arrayed waveguide module using the arrayed waveguide grating device according the eighth feature of the invention. According to the construction of the tenth feature of the invention, the fixation of the first and second end faces, in such a state that the end faces have been moved according to need, can realize wavelength correction on the input side with high accuracy. Further, since two components are fixed to each other to constitute one arrayed waveguide grating device, the yield can be improved as compared with the arrayed waveguide grating device is produced as a single component.

According to the eleventh feature of the invention, an optical communication system comprises (i) a circular transmission line comprising a plurality of nodes which have been circularly connected through transmission lines, a wavelength division multiplexed optical signal being transmitted through the circular transmission line, each of the nodes comprising: an arrayed waveguide grating device for separating the wavelength division multiplexed optical signal into optical signals of respective wavelengths and an arrayed waveguide grating device for wavelength division multiplexing the separated optical signals of respective wavelengths, (ii) wherein at least one of the arrayed waveguide grating devices comprises a single or plurality of input waveguides provided on a first substrate, a first input-side slab waveguide which is connected to the input waveguide and is in such a form that a slab waveguide provided on the first substrate has been cut together with the first substrate at a predetermined position and the first half portion on the first substrate side has been left, a second input-side slab waveguide which is in such a form that a slab waveguide, identical to said slab waveguide, provided on a second substrate, which is the same or different from the first substrate, has been cut together with the second substrate at said predetermined position and the second half portion on the second substrate side has been left, said second input-side slab waveguide being fixed to the first input-side slab waveguide in such a state that the cut face of the second input-side slab waveguide and the cut face of the first input-side slab waveguide have been relatively moved by a desired degree according to need, a channel waveguide array which is provided on the second substrate so as for waveguides constituting the channel waveguide array to respectively have successively increased lengths in a pre-determined waveguide length increment and is connected to the second input-side slab waveguide, an output waveguide provided on the second substrate, and an output-side slab waveguide which is provided on the second substrate and connects the channel waveguide array to the output waveguide.

The eleventh feature of the invention provides an optical communication system using the arrayed waveguide grating device according the first feature of the invention. According to the construction of the eleventh feature of the invention, for these arrayed waveguide grating devices, the wavelength correction on the input side can be carried out with high accuracy. Further, since two components are fixed to each other to constitute one arrayed waveguide grating device, as compared with the arrayed waveguide grating device is produced as a single component, the yield can be improved and the cost of the system can be reduced.

According to the twelfth feature of the invention, an optical communication system comprising (i) a circular transmission line comprising a plurality of nodes which have been circularly connected through transmission lines, a wavelength division multiplexed optical signal being transmitted through the circular transmission line, each of the nodes comprising: an arrayed waveguide grating device for separating the wavelength division multiplexed optical signal into optical signals of respective wavelengths and an arrayed waveguide grating device for wavelength division multiplexing the separated optical signals of respective wavelengths, (ii) wherein at least one of the arrayed waveguide grating devices comprises a first substrate on which a single or plurality of input waveguides and a first input-side slab waveguide connected to the input waveguide are disposed and which has a first end face in a region where the input-side Blab waveguide has been disposed, and a second substrate on which a second input-side slab waveguide, a channel waveguide array constructed so as for waveguides constituting the channel waveguide array to respectively have successively increased lengths in a pre-determined waveguide length increment and connected to the input-side slab waveguide, a plurality of output waveguides, and an output-side slab waveguide for connecting the channel waveguide array to the output waveguide are disposed and which has an end face in a region where the second slab waveguide has been disposed, said first end face having been fixed to said second end face so that light, which has emerged from the input-side waveguide and entered the first input-side slab waveguide, is optically coupled to the channel waveguide array through the second slab waveguide.

The twelfth feature of the invention provides an optical communication system using the arrayed waveguide grating device according to the eighth feature of the invention. According to the construction of the twelfth feature of the invention, for these arrayed waveguide grating devices, the wavelength correction on the input side can be carried out with high accuracy. Further, in these arrayed waveguide grating devices, since two components are fixed to each other to constitute one arrayed waveguide grating device, as compared with the arrayed waveguide grating device is produced as a single component, the yield can be improved and the cost of the system can be reduced.

BRIEF DESCRIPTION OF THE DRAWINGS

The invention will be explained in more detail in conjunction with the appended drawings, wherein:

FIG. 29 is a plan view showing a shape around an input-side slab waveguide in an eighth variant of the invention;

FIG. 30 is a plan view showing a shape around an input-side slab waveguide of which the slab length has been simply increased for comparison with the eighth variant of the invention;

DESCRIPTION OF THE PREFERRED EMBODIMENTS

The invention will be explained in more detail in conjunction with preferred embodiments.

Figure 5:
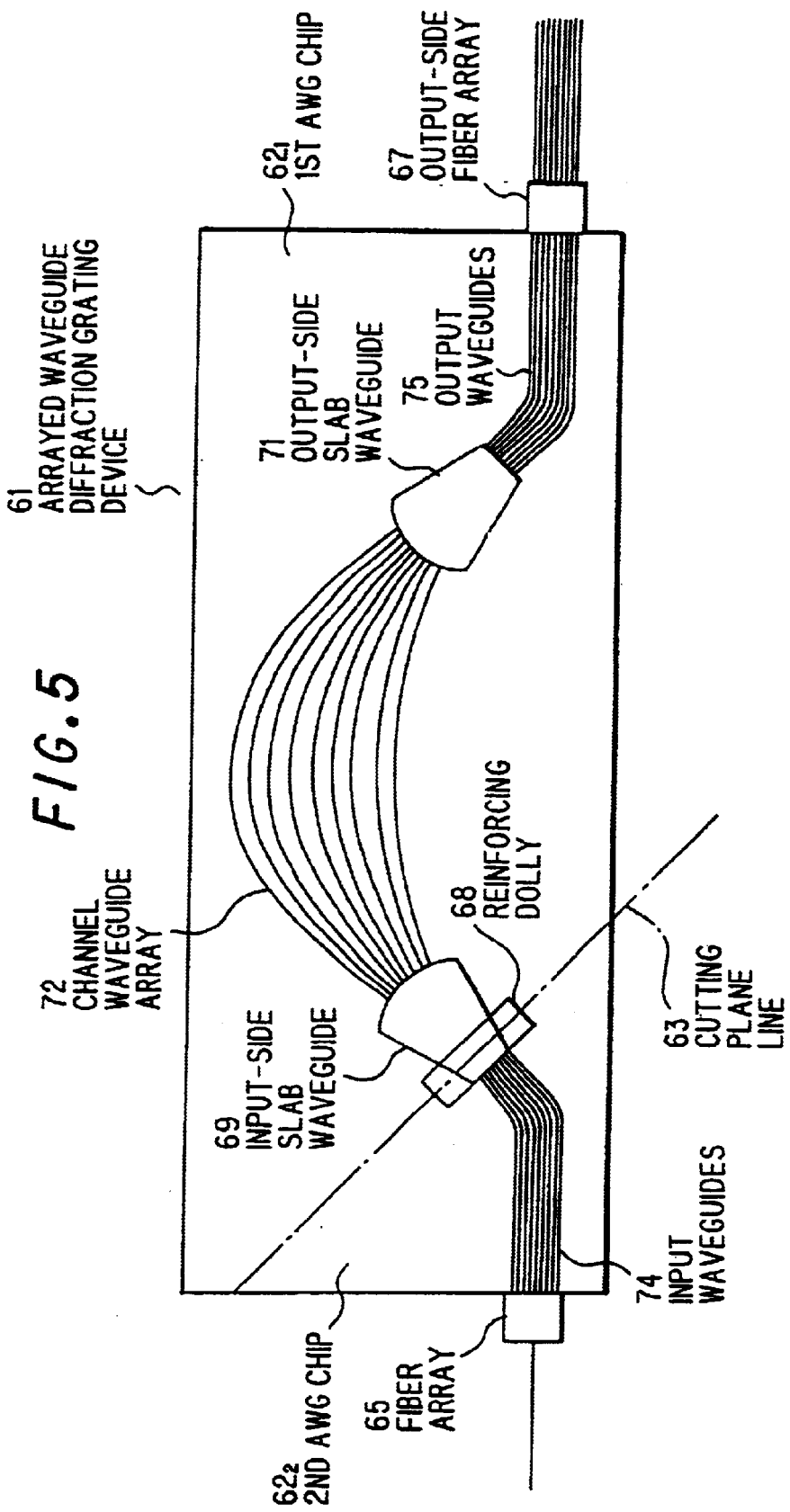
FIG. 5 is a plan view showing an arrayed waveguide grating device according to a preferred embodiment of the invention.

FIG. 5 shows an arrayed waveguide grating device according to an preferred embodiment of the invention., This arrayed waveguide grating device 61 comprises two chips, a first AWG (arrayed waveguide) chip $62_1$ and a second AWG chip $62_2$ bonded (fixed) to the first AWG chip $62_1$ through a cutting plane line 63. These first and second AWG chips $62_1$ and $62_2$ have originally constituted a single wafer, and the single wafer was cut at a position of the cutting plane line 63 into the first and second AWG chips $62_1$ and $62_2$ which were then relatively moved by a desired degree toward the cutting plane line 63 followed by fixing both the chips to each other, for example, with the aid of an adhesive.

An input-side fiber array 65 is attached to one end of the second AWG chip $62_2$. An output-side fiber array 67 is attached to the end of the first AWG chip $62_2$ on its side remote from the input-side fiber array 65. An input-side slab waveguide 69 with a reinforcing dolly 68 bonded to the input-side end thereof is disposed at the interface of the first AWG chip $62_1$ and the second AWG chip $62_2$, and an output-side slab waveguide 71 is disposed at a position around the fiber array 67 in the first AWG chip $62_1$. A channel waveguide array 72 is disposed between the input-side slab waveguide 69 and the output-side slab waveguide 71 in such a manner that channel waveguides are bent at respectively different curvatures in a given direction. Input waveguides 74 are arranged between the fiber array 65 and the input-side slab waveguide 69, and output waveguides 75 are arranged between the output-side fiber array 67 and the output-side slab waveguide 71.

Figure 6:
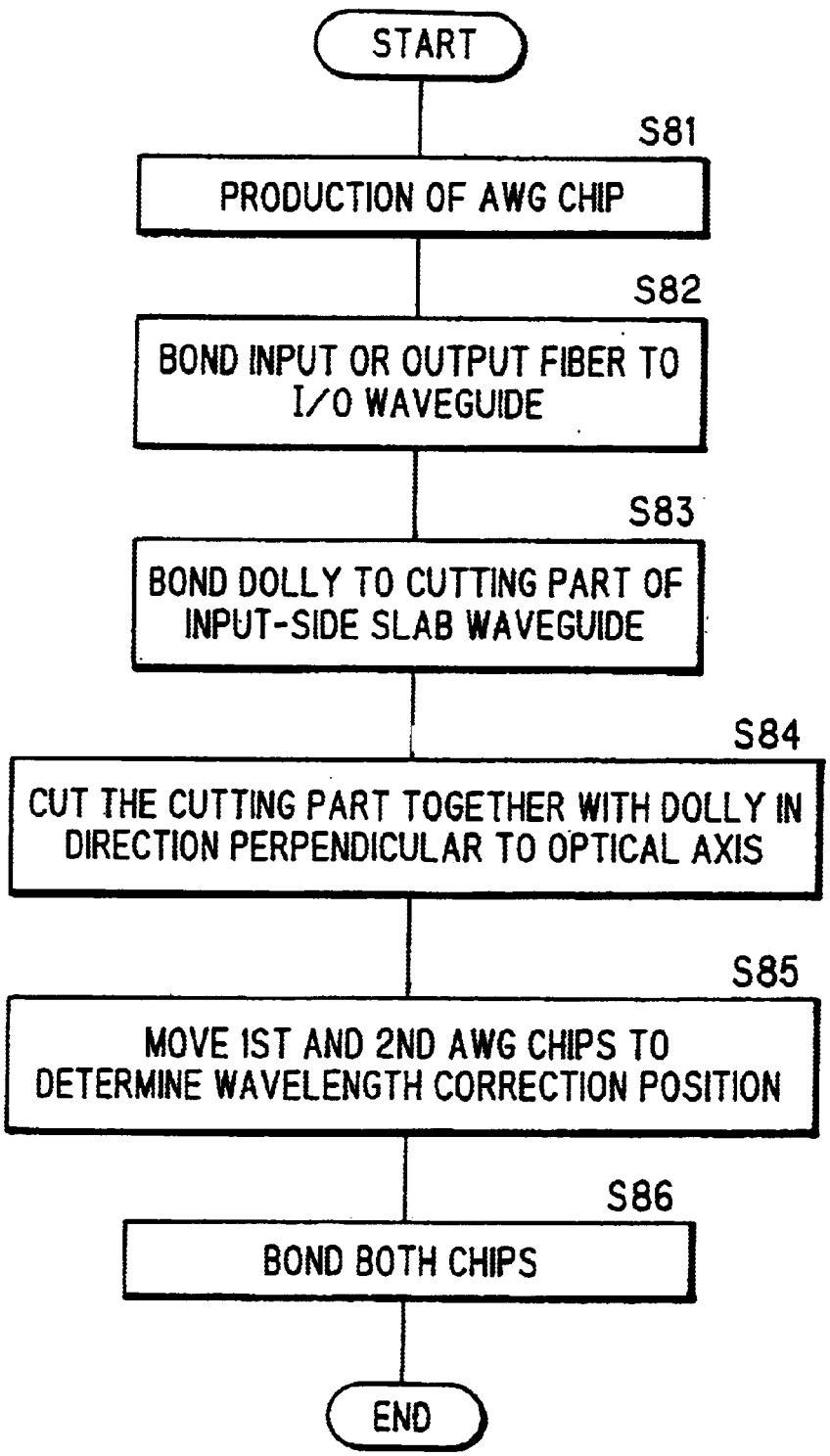
FIG. 6 is a flow diagram showing a production process of the arrayed waveguide grating device according to the preferred embodiment shown in FIG. 5.

FIG. 6 is a flow diagram showing the production process of the arrayed waveguide grating device according to the present preferred embodiment. A chip to be cut into two chips, the first AWG chip $62_1$ and the second AWG chip $62_2$, and is first taken off from a wafer (step S81). The input-side slab waveguide 69 and the output-side fiber array 67 are attached to this chip, and the input-side fiber array 65 and the output-side fiber array 67 are bonded (step S82). Next, in order to reinforce a cutting site indicated by a cutting plane line 63 in the input-side slab waveguide 69, a dolly 68 is bonded to the upper surface, the lower surface, or both the upper and lower surfaces of the slab waveguide in its site (step S83) The cutting site indicated by the cutting plane line 63 is cut in a direction perpendicular to the optical axis (step S84) The cut end faces are polished so that they are connected to each other in a good state. At that time, the input-side fiber array 65 and the output-side fiber array 67 are allowed to remain attached respectively to the first AWG chip $62_1$ and the second AWG chip $62_2$.

These first AWG chip $62_1$ and second AWG chip $62_2$ are subjected to optical axis alignment to determine a desired position for wavelength correction relative to a cutting direction parallel to the cutting plane line 63 (step S85). At that position, the first AWG chip $62_1$ and the second AWG chip $62_2$ are fixed to each other with an adhesive (step S86). The adhesive may be, for example, UV (ultraviolet) curable resin or a thermosetting resin. When the UV-curable resin is used, a transparent substrate, such as a quartz substrate, that is, a substrate having high ultraviolet light transmission, is preferably used as the device substrate material in consideration of ultraviolet light transmission. The input-side slab waveguide 69 should be designed in a longer length by a cutting margin at the time of cutting and a polishing margin because the input-side slab waveguide 69 is cut, shifted, and then fixed.

First variant

In the arrayed waveguide grating device 61 shown in FIG. 5, the use of a single input waveguide 74 suffices for contemplated results. The reason why a plurality of input waveguides are often provided is to select a good input waveguide from the plurality of input waveguides. This is true of the invention. In step S85, light is introduced from the input waveguides 74 as shown in FIG. 5, and aligning is carried out along the cutting plane line 63 while varying the positional relationship between the first AWG chip $62_1$ and the second AWG chip $62_2$. However, when the aligning level is increased, the light incident position in the input-side slab waveguide 69 is deviated from the Rowland disposition, resulting in a deviation of the focal point from the designed value.

Figure 7:
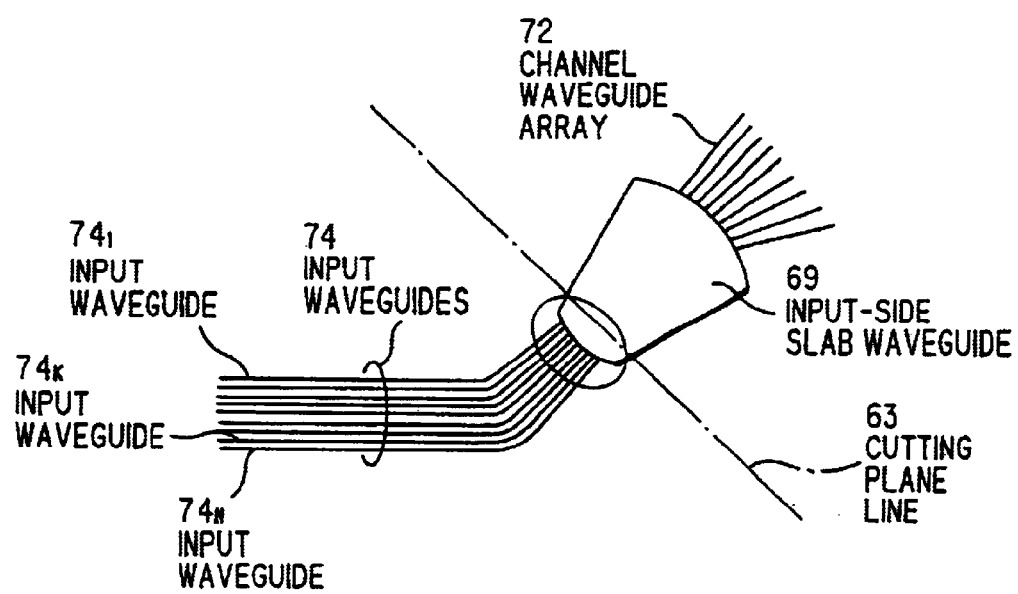
FIG. 7 is a plan view showing a portion around an input-side slab waveguide of an arrayed waveguide grating device in a first variant of the invention.

FIG. 7 is an enlarged diagram showing a portion around an input-side slab waveguide of an arrayed waveguide grating device in a first variant which is useful in this case. In FIGS. 5 and 7, the same parts are identified with the same reference numerals, and the explanation thereof will be omitted. Further, in FIG. 7, the dolly 68 (see FIG. 5) is not shown for simplification.

In the first variant, a plurality of waveguides $74_1$ to $74_N$ are provided as the input waveguide 74 connected to the input-side slab waveguide 69. Among these input waveguides $74_1$ to $74_N$, one input waveguide $74_K$, which is closest to the slab movement position according to the wavelength correction level, is finally selected as an input waveguide. This technique can reduce an isolation deterioration attributable to the deviation of the input waveguide from the Rowland circle.

Figure 1:
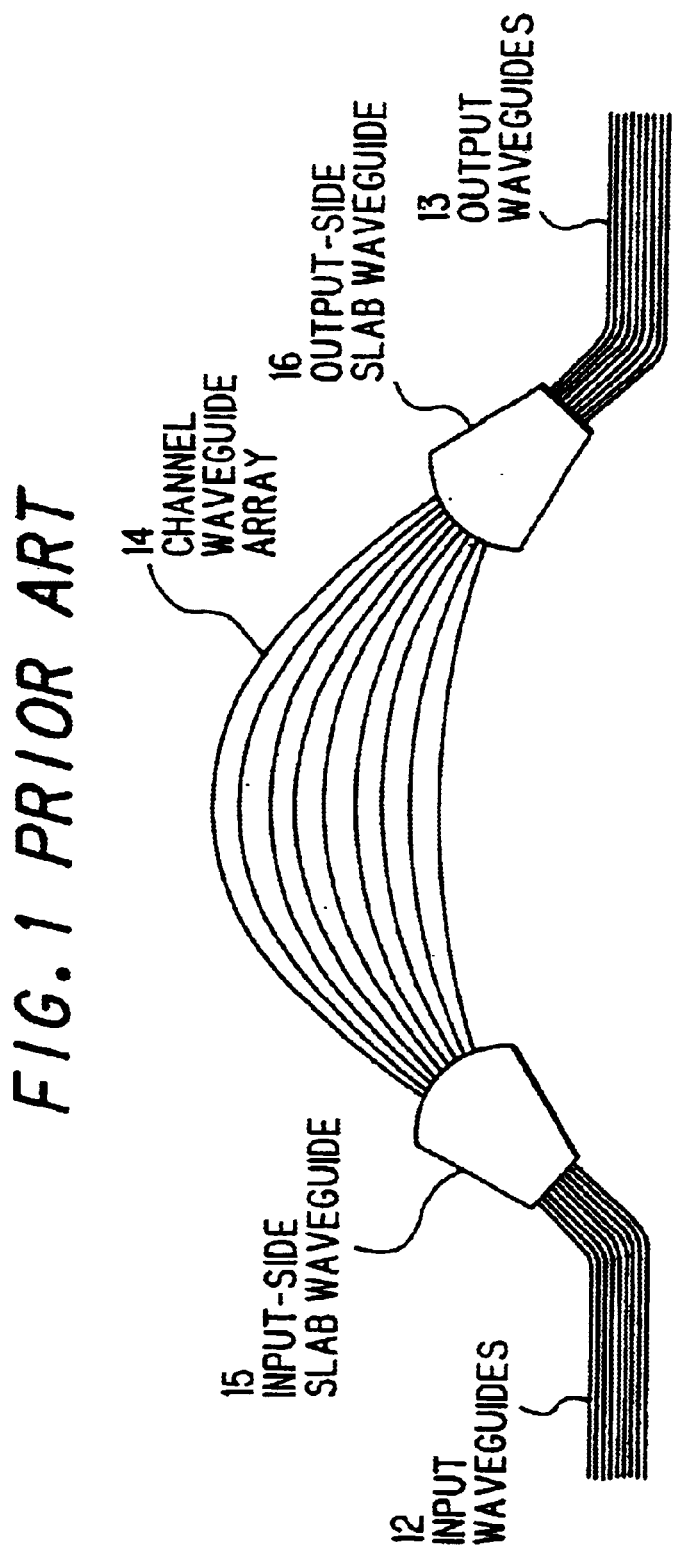
FIG. 1 is a plan view showing the whole construction of a conventional arrayed waveguide grating.
Figure 2:
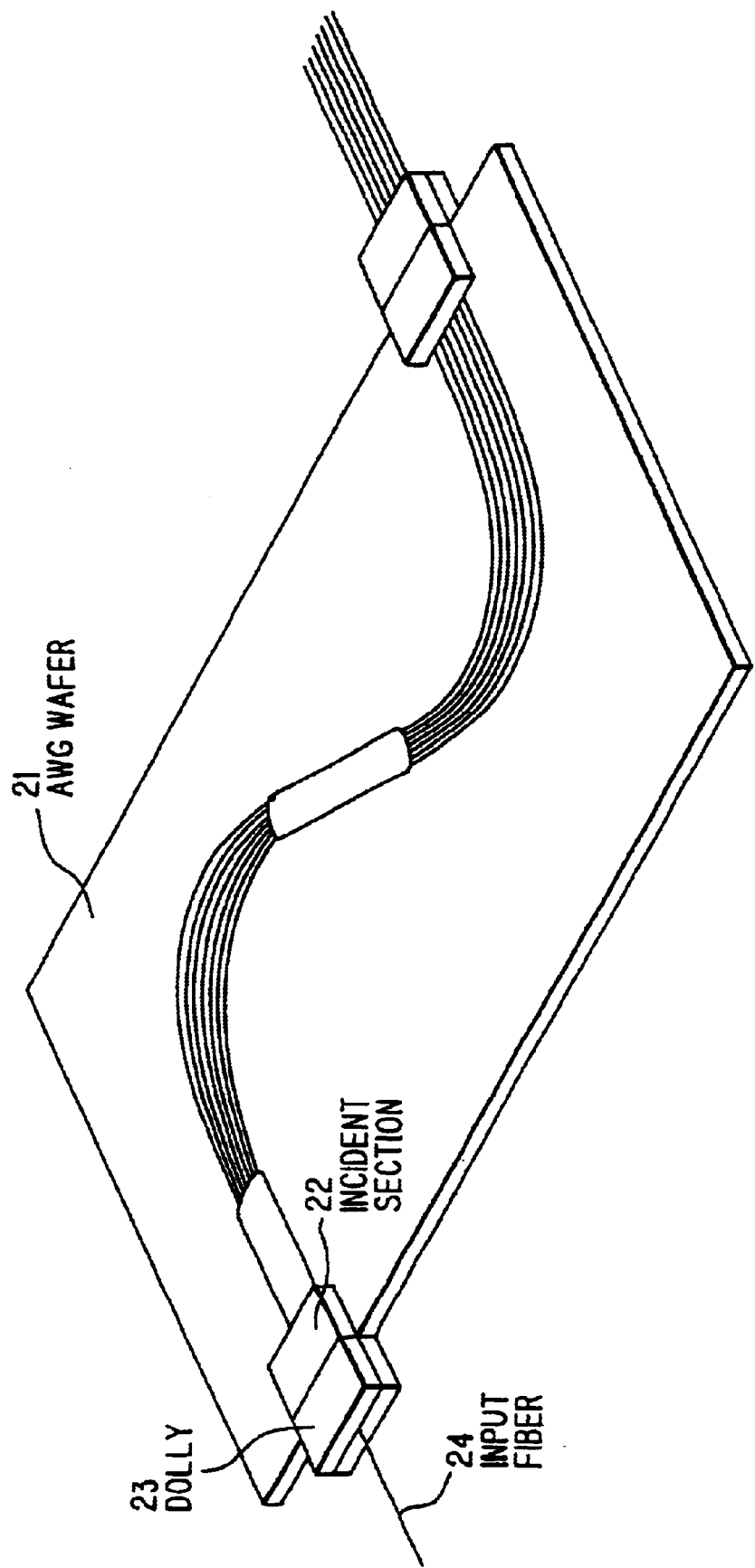
FIG. 2 is a perspective view showing the construction of an arrayed waveguide grating device in which a substrate has been cut at a slab incident section on the input side of an arrayed waveguide wafer.
Figure 3:
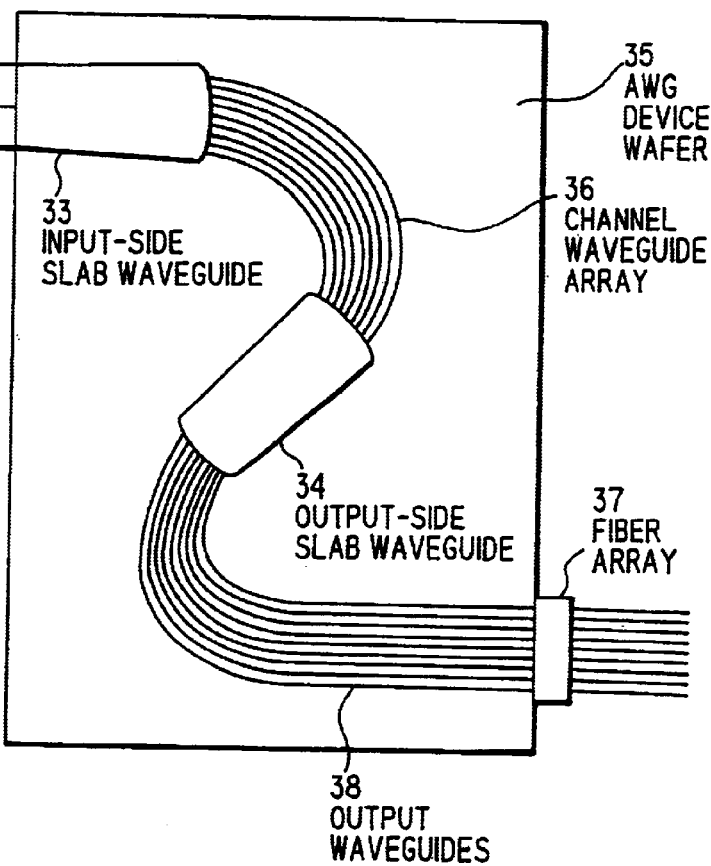
FIG. 3 is a plan view showing the construction of an arrayed waveguide grating device wherein an input fiber has been connected to an input-side slab waveguide through an optical waveguide for a slab waveguide.

Incidentally, when the same matter in the conventional arrayed waveguide grating device shown in FIG. 2 or 3 is attempted, the movement of the input fiber or PLC (planar lightwave circuit) causes a deviation from the Rowland circle by this movement level.

Second variant

Figure 8:
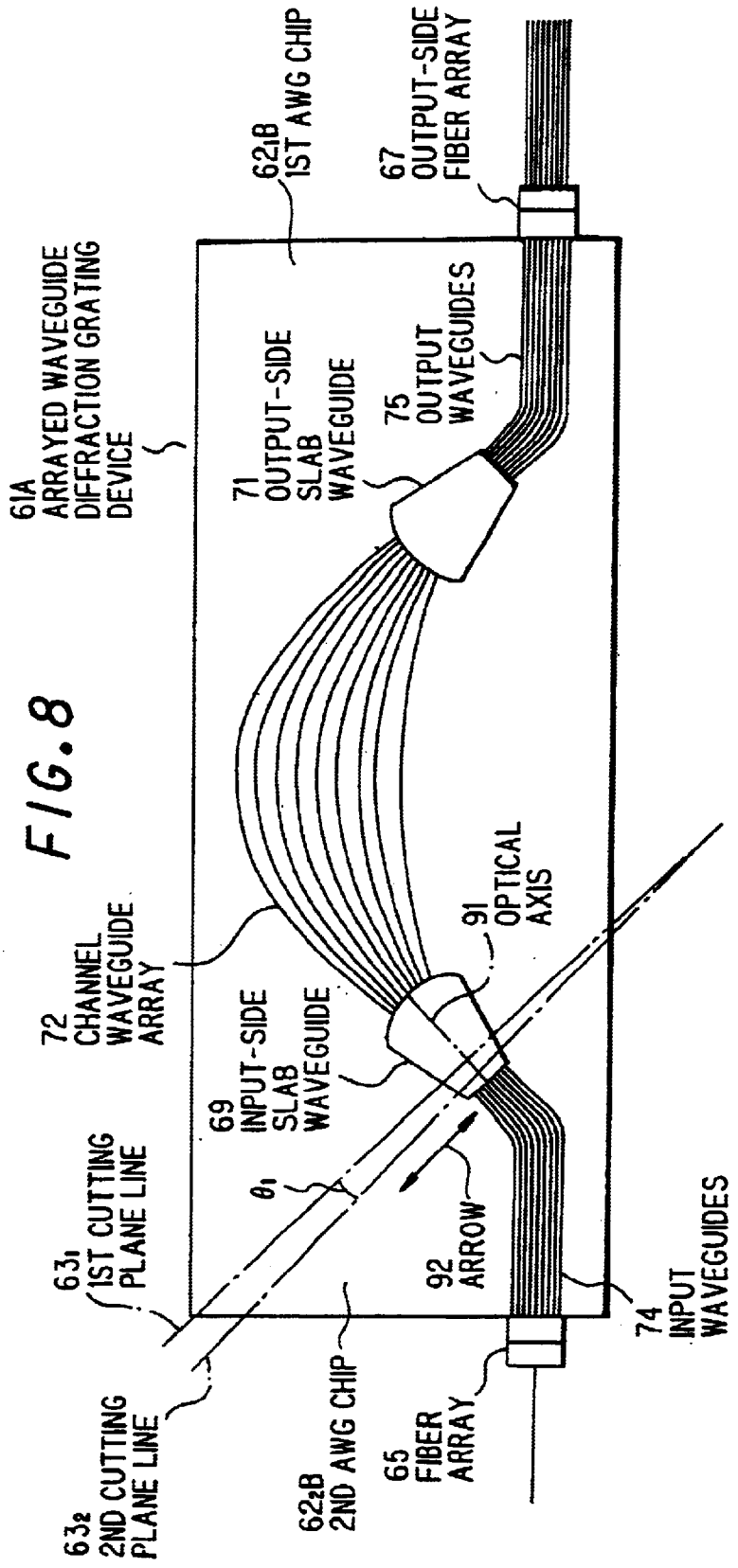
FIG. 8 is a diagram illustrating the production principle of an arrayed waveguide grating device in a second variant of the invention.

FIG. 8 is a diagram illustrating an arrayed waveguide grating device in a second variant of the invention wherein the reflection of light caused by the slab cut portion has been reduced. In the above preferred embodiment, a wafer was cut into the first AWG chip $62_1$ and the second AWG chip $62_2$ which were then bonded to each other. In this case, there is sometimes a fear of causing the reflection of light at the slab cut portion. In FIGS. 5 and 8, the same parts are identified with the same reference numerals, and the explanation thereof will be omitted.

In the arrayed waveguide grating device 61A in this second variant, the input-side slab waveguide 69 is cut at a second cutting plane line $63_2$ which makes a small angle of $\theta_1$ with a first cutting plane line 63, for cutting in a face perpendicular to the surface of the optical axis 91 and the AWG chip 62, and the cut faces are moved toward a direction 92 indicated by an arrow along the second cutting plane line $63_2$ to adjust the positions of the first AWG chip $62_1$B and the second AWG chip $62_2$B, followed by bonding of the first AWG chip $62_1$B and the second AWG chip $62_2$B to each other.

In general, when the input-side slab waveguide 69 is cut at an angle, that is not normal to the optical axis 91 of the input-side slab waveguide 69, into two parts which are then moved in the direction 92 indicated by the arrow, the focal length of the slab varies according to the movement position, leading to a fear of causing an isolation deterioration. However, as described above in connection with the second variant, when the angle $\theta_1$ of the first cutting plane line $63_1$ to the second cutting plane line 63, is set to a small value and the positional relationship between the first AWG chip $62_1$B and the second AWG chip $62_2$B is such that the position is moved, for example, by about 100 $\mu$m from the center position, the error of the slab focal length is about 10 $\mu$m which is much smaller than the slab length 10 to 20 mm of the input-side slab waveguide 69. Therefore, there is substantially no isolation deterioration.

In the variant shown in FIG. 8, the position indicated by the second cutting plane line $63_2$ as the slab cutting position is set on the incident side relative to the first cutting plane line $63_1$. Likewise, positioning the slab cutting position on the channel waveguide array 72 side can also reduce the reflection.

Third variant

Figure 9:
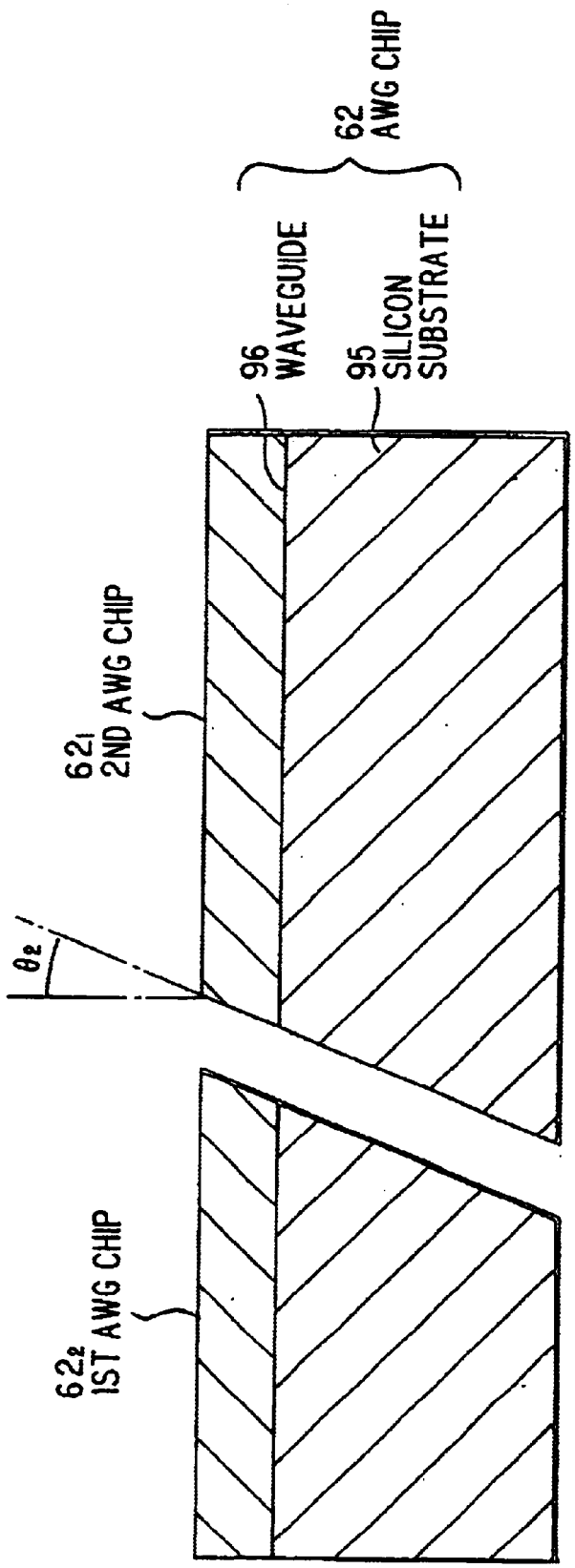
FIG. 9 is an enlarged end view of a cut site of an arrayed waveguide grating device in a third variant of the invention.

FIG. 9 is a diagram illustrating the principal part of an arrayed waveguide grating device in a third variant of the invention. In the second variant described above, the input-side slab waveguide 69 is cut at a face perpendicular to the surface of the AWG chip 62. On the other hand, in the third variant, the chip 62 composed of the silicon substrate 95 and the waveguide 96 is cut in the state of inclination at a very small angle $\theta_2$ to the thicknesswise direction of the chip 62 to provide the first AWG chip $62_1$ and the second AWG chip $62_2$. Adjustment of the position of these cut faces followed by bonding to the cut faces to each other, as with the second variant, can prevent the reflection of light caused at the slab cut portion.

In preventing the reflection of light caused at the slab cut portion, inclination directions shown in FIGS. 8 and 9 may be used in proper combination to set the cut face. That is, in general, when the cut face is slightly deviated in a predetermined direction on a three-dimensional space from a face perpendicular to the optical axis, the reflection of light caused at the slab cut portion can be prevented.

Fourth variant

Figure 10:
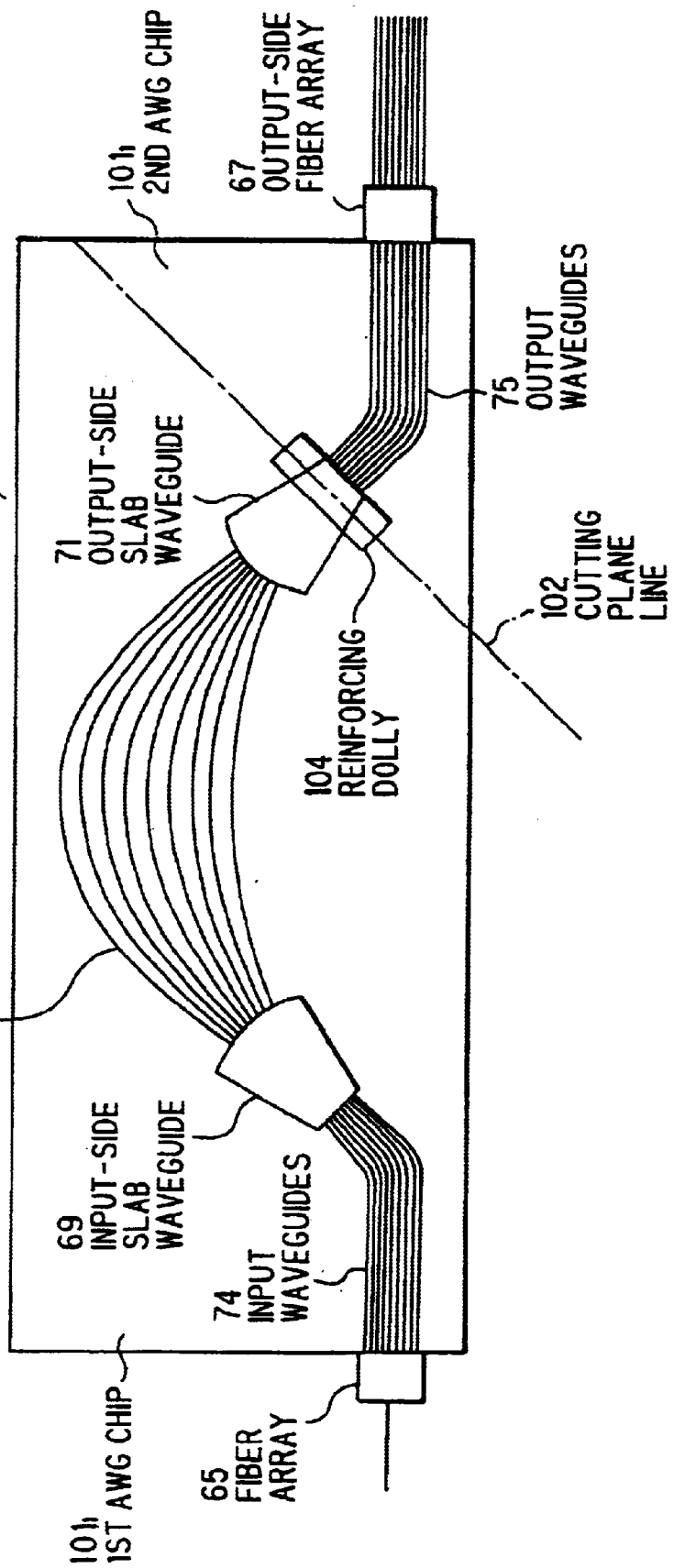
FIG. 10 is a plan view showing an arrayed waveguide grating device in a fourth variant of the invention.

FIG. 10 shows an arrayed waveguide grating device in a fourth variant of the invention. In FIGS. 5 and 10, the same parts are identified with the same reference numerals, and the explanation thereof will be omitted. The arrayed waveguide grating device 61B in the fourth variant comprises two chips, a first AWG chip $101_1$ and a second AWG chip $101_2$ bonded to the first AWG chip $101_1$ through a cutting plane line 102. The first and second AWG chips $101_1$, $101_2$ have originally constituted a single wafer. The single wafer has been cut at a position indicated by a cutting plane line 102 into the first and second AWG chips $101_1$, $101_1$ which were then moved in the direction of the cutting plane line 102 by a desired degree, followed by fixing the first and second AWG chips $101_1$, $101_2$ to each other, for example, with an adhesive. An output-side slab waveguide 71, in which a reinforcing dolly 104 has been bonded to the output-side end thereof, is disposed at the interface of the first AWG chip $101_1$ and the second AWG chip $101_2$.

Also in this variant, as with the arrayed waveguide grating device 61 shown in FIG. 5, the wavelength correction can be carried out by regulating the position at which the first and second AWG chips $101_1$, $101_2$ are bonded to each other. It is a matter of course that, as with the second variant shown in FIG. 8, in the fourth variant shown in FIG. 10, when the cutting site is a face which is slightly deviated in a predetermined direction on a three-dimensional space from a face perpendicular to the optical axis, the influence of reflection can be prevented.

Fifth variant

Figure 11:
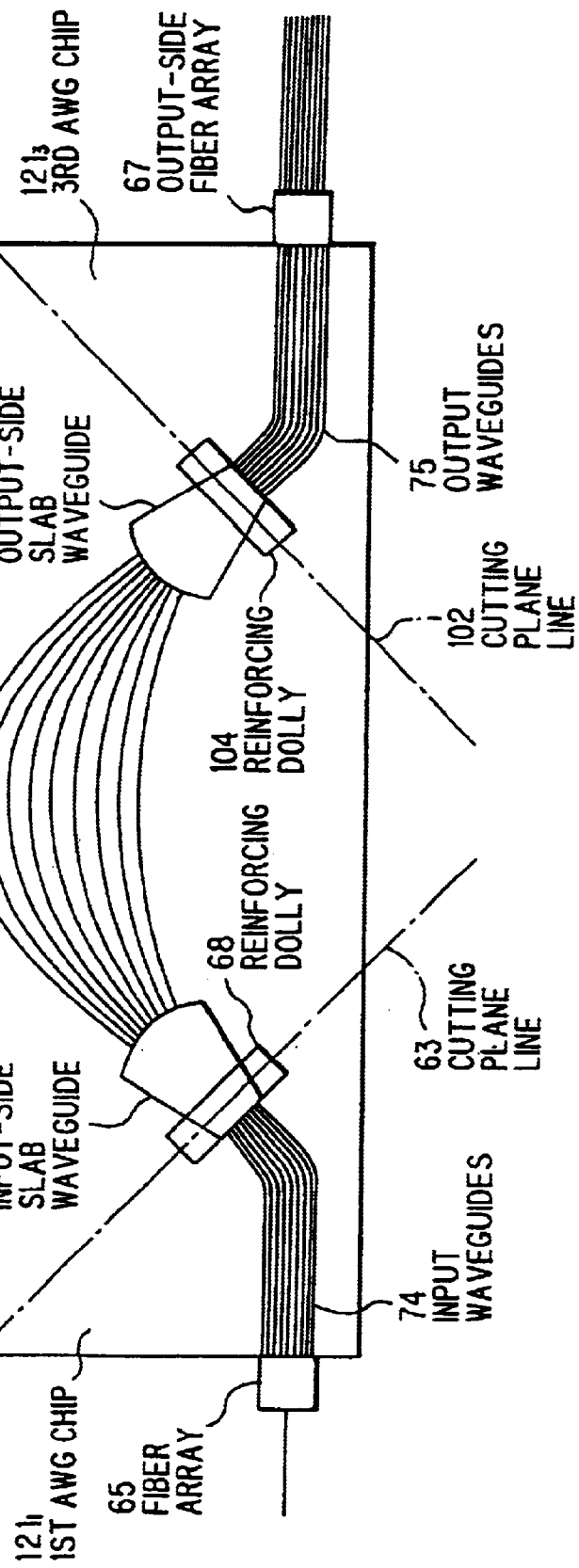
FIG. 11 is a plan view showing an arrayed waveguide grating device in a fifth variant of the invention.

FIG. 11 shows an arrayed waveguide grating device in a fifth variant of the invention. In FIGS. 5, 10, and 11, the same parts are identified with the same reference numerals, and the explanation thereof will be omitted. The arrayed waveguide grating device 61C in the fifth variant comprises, three chips, a first AWG chip $121_1$, a second AWG chip $121_2$ bonded to the first AWG chip $121_1$ through a cutting plane line 63, and a third AWG chip $121_3$ bonded to the second AWG chip $121_2$ through another cutting plane line 102. These first to third AWG chips $121_1$ to $121_3$ have originally constituted a single wafer. The single wafer was cut at positions indicated by the cutting plane lines 63, 102 into three parts which each were moved by a desired degree in the directions of the cutting plane lines 63, 102, followed by fixation to one another, for example, with an adhesive. One of the cutting plane lines, i.e., the cutting plane line 63 is for cutting the input-aide slab waveguide 69 as in the case of the above preferred embodiment, while the other cutting plane line 102 is for cutting the output-side slab waveguide 71 as in the case of the fourth preferred embodiment.

Figure 4:
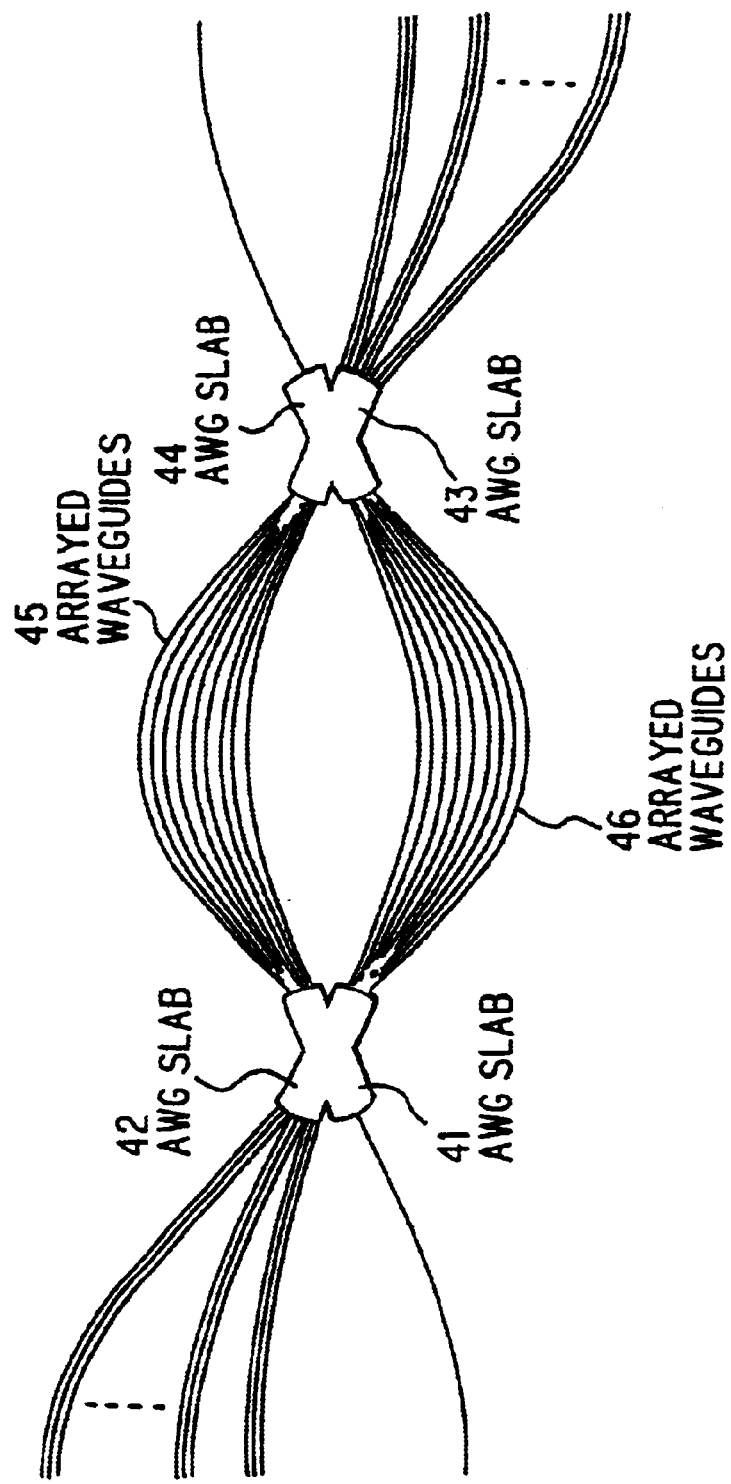
FIG. 4 is a diagram illustrating an example of biconnected arrayed waveguides which can be adopted for improving the yield.

Also in this variant, as with the arrayed waveguide grating devices 61, 61A described above in connection with the preferred embodiment and variants, the wavelength can be regulated by regulating the position of bonding between the first and second AWG chips $121_1$, $121_2$ and regulating the position of bonding between the second and third AWG chips $121_2$, $121_3$. It is a matter of course that, as with the second variant shown in FIG. 4, in the fifth variant shown in FIG. 11, when the cutting site is a face which is slightly deviated in a predetermined direction on a three-dimensional space from a face perpendicular to the optical axis, the influence of reflection can be prevented.

Sixth variant

In the above preferred embodiment and variants, one of or both input-side and output-side slab waveguides are cut into parts which were then moved by a desired distance followed by bonding of these parts to each other or one another. A method may also be used wherein, instead of cutting of an identical substrate provided with the waveguide into parts followed by bonding of the parts to each other, different substrates are provided and bonded to each other. Further, one pattern provided by cutting a certain slab waveguide and a waveguide substrate having another pattern may be separately mass produced, and then used in proper combination according to need to realize an arrayed waveguide grating device having desired characteristics or functions.

In particular, when a plurality of components in such a form obtained by cutting the arrayed waveguide grating device at the site of the slab waveguide are separately produced, it is possible to produce, with respectively different accuracies, components required to be fabricated with high accuracy, for example, the channel waveguide array 72, and other components. This can realize an efficient production process, and, in addition, can improve the yield.

Figure 12:
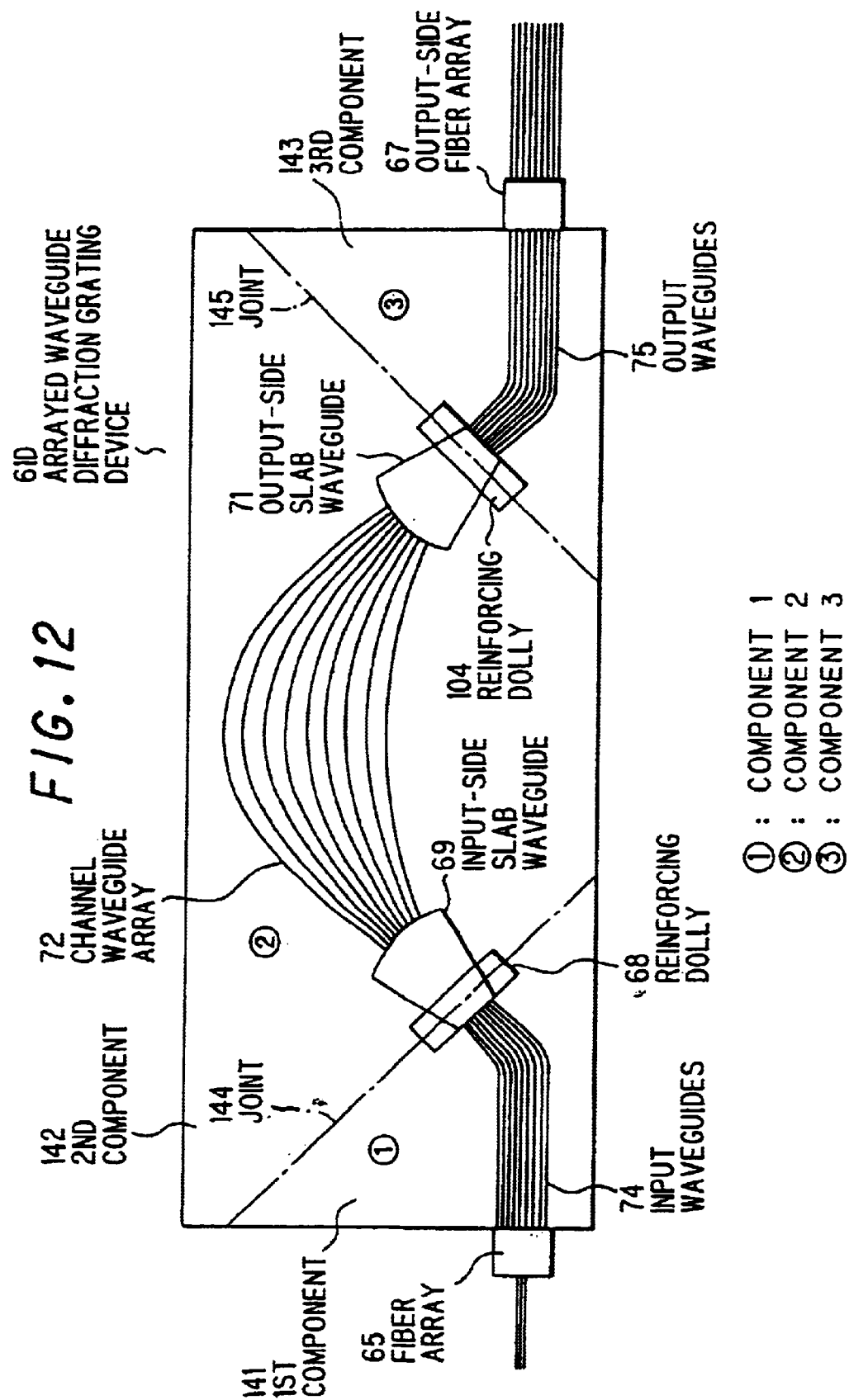
FIG. 12 is a plan view showing a sixth variant of the invention wherein three components for one arrayed waveguide grating device have been produced separately from each other and then bonded to one another to prepare the arrayed waveguide grating device.

FIG. 12 is a diagram showing a state such that three components for one arrayed waveguide grating device have been produced separately from one other and then bonded to one another to prepare the arrayed waveguide grating device. The first to third components 141 to 143 are bonded to one another at joint faces 144, 145 to complete one arrayed waveguide grating device 61D. One of the joint faces, the joint face 144, is a face for joining the input-side slab waveguide 69, and the other joint face 145 is a face for joining the output-side slab waveguide 71.

Figure 13:
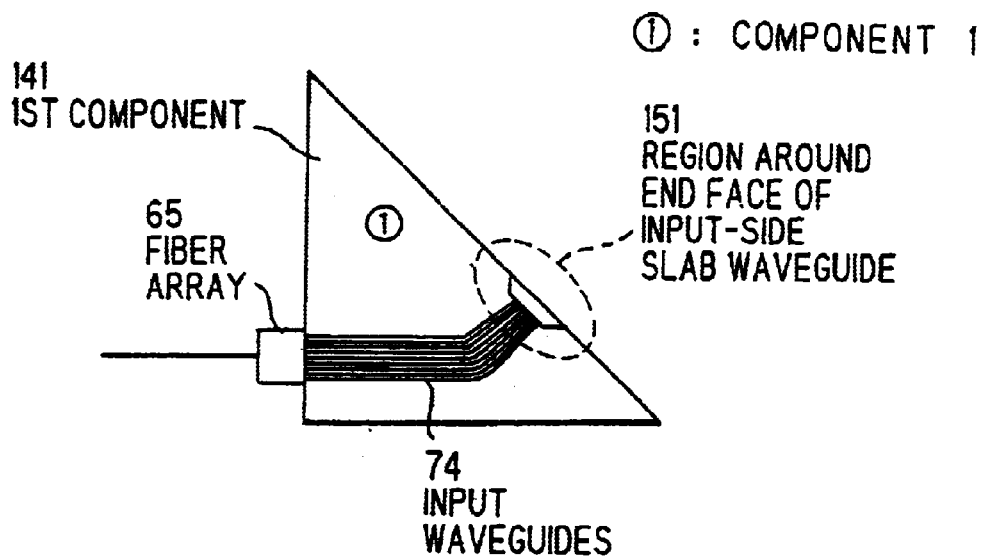
FIG. 13 is a plan view showing only the first component in the sixth variant of the invention.
Figure 14A:
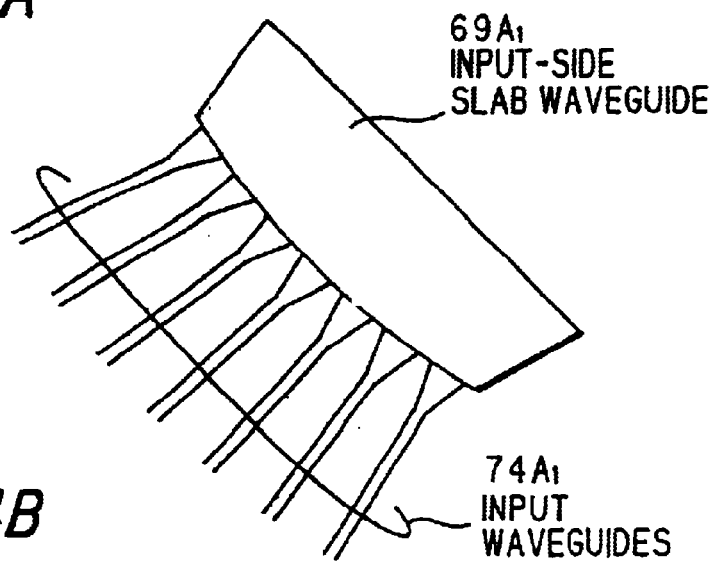
FIG. 14A is a diagram illustrating the first shape of a connection of the input waveguides connected to the input-side slab waveguide in the sixth variant of the invention.
Figure 14B:
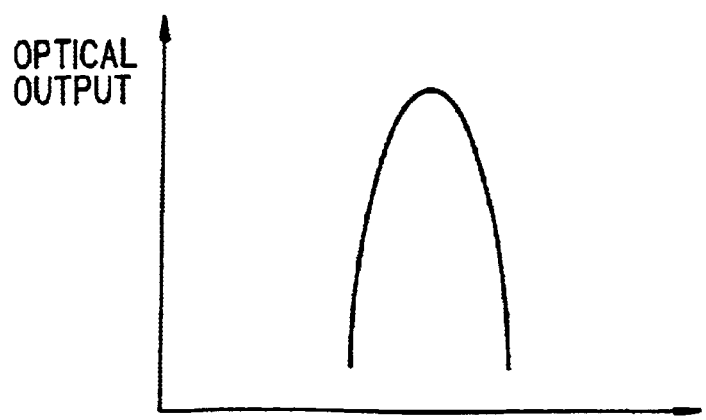
FIG. 14B is a first example of wavelength characteristics obtained in the construction shown in FIG. 14A.
Figure 15A:
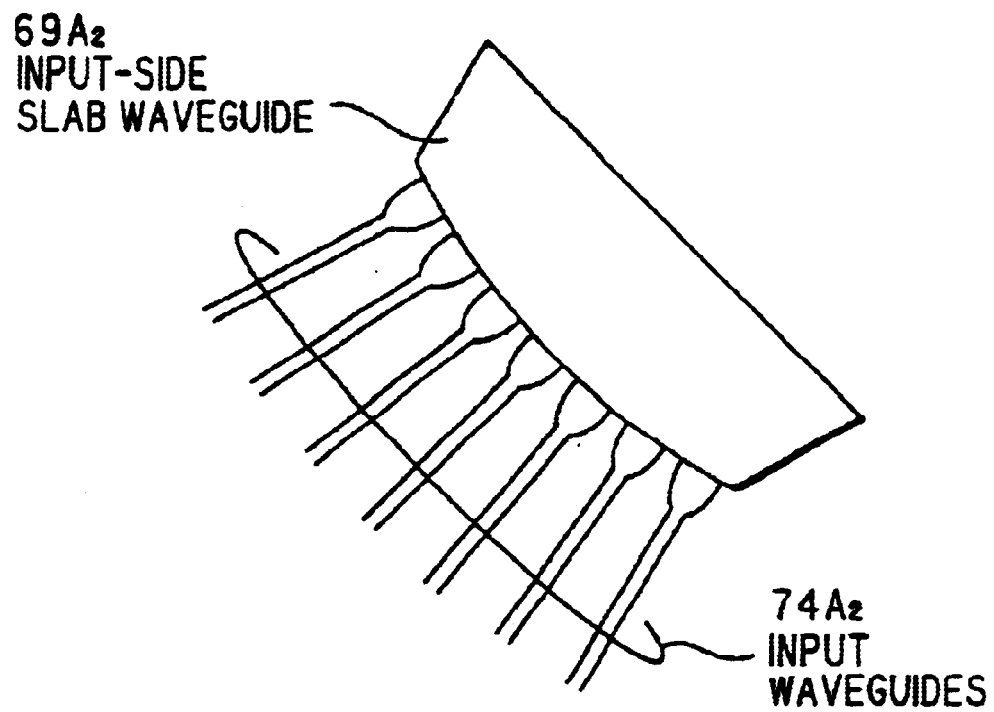
FIG. 15A is a diagram illustrating the second shape of a connection of the input waveguides connected to the input-side slab waveguide in the sixth variant of the invention.
Figure 15B:
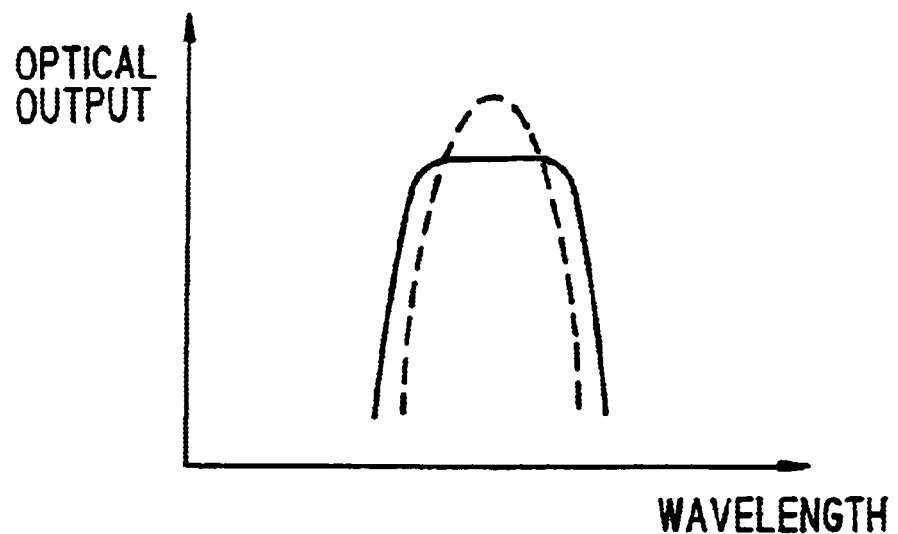
FIG. 15B is a second example of wavelength characteristics obtained in the construction shown in FIG. 15A.
Figure 16A:
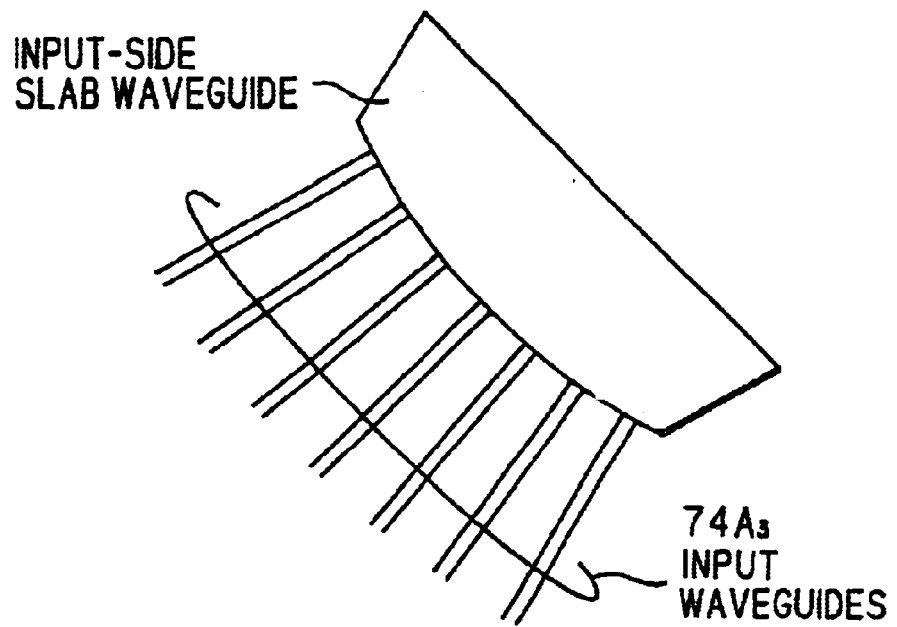
FIG. 16A is a diagram illustrating the third shape of a connection of the input waveguides connected to the input-side slab waveguide in the sixth variant of the invention.
Figure 16B:
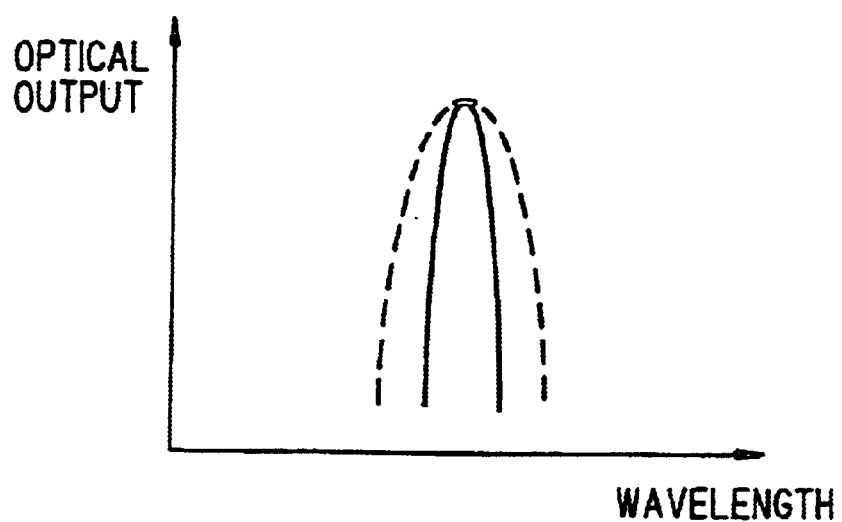
FIG. 16B is a third example of wavelength characteristics obtained in the construction shown in FIG. 16A.

FIG. 13 is a diagram showing only the first component. FIGS. 14 to 16 are enlarged views of a region 151 around the end face of the input-side slab waveguide in a cut form shown in FIG. 13 (FIGS. 14A, 15A, and 16A), and show the optical output characteristics of these arrayed waveguide grating devices (FIGS. 14B, 15B, and 16B). For example, in FIG. 14A, the shape of the connection of the input waveguide $74A_1$ to the input-side slab waveguide $69A_1$ is intermediate between a further enlarged shape shown in FIG. 15A and a straight shape shown in FIG. 16A. Therefore, when the first component 141 using this input waveguide $74A_1$ is used, the use of a component having standard characteristics as the third component 143 can provide a spectrum of ordinary wavelength characteristics shown in FIG. 14B.

On the other hand, the use of the first component 141 using the input waveguide $74A_2$ as shown in FIG. 15A can provide a spectrum of wavelength characteristics such that the top portion is flat as indicated by a solid line in FIG. 15B. Further, the use of the first component 141 using the input waveguide $74A_3$ as shown in FIG. 16A can provide a spectrum of wavelength characteristics such that the top portion is steep as indicated by a solid line in FIG. 16B. Therefore, any one of the input waveguides $74A_1$ to $74A_3$ may be selected and used in the first component 141 according to the desired spectral form.

Figure 17:
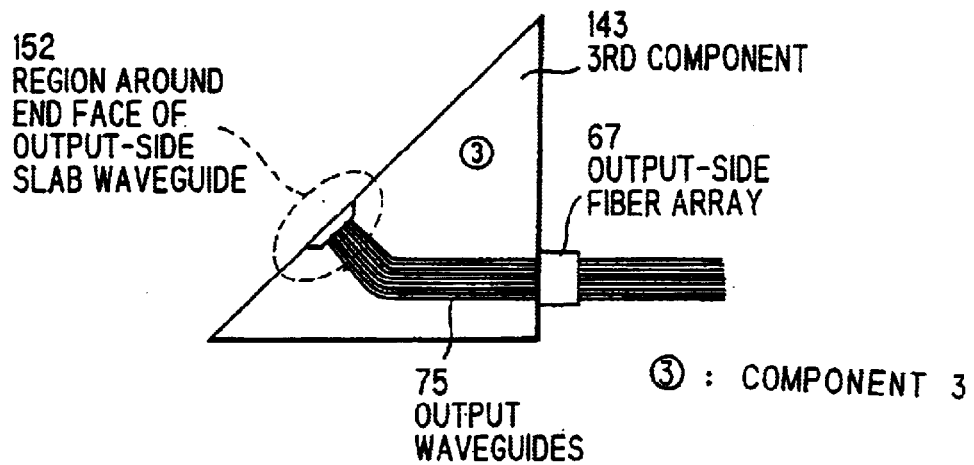
FIG. 17 is a plan view showing only the third component in the sixth variant of the invention.
Figure 18A:
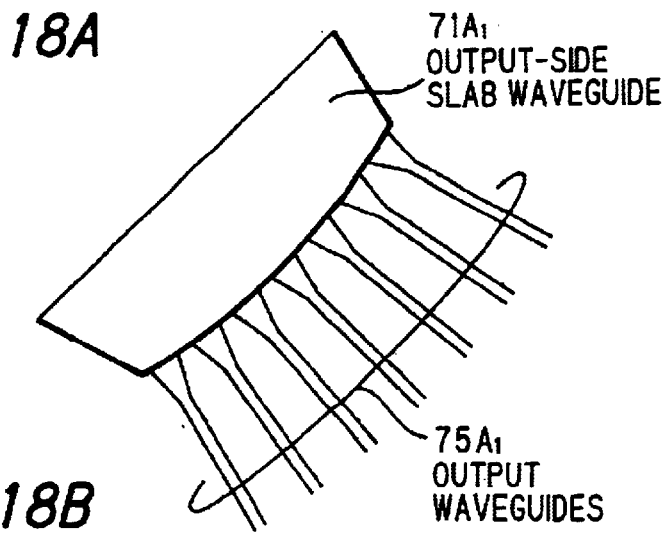
FIG. 18A is a diagram illustrating a region around the end face of the output-side slab waveguide in the sixth variant of the invention.
Figure 18B:
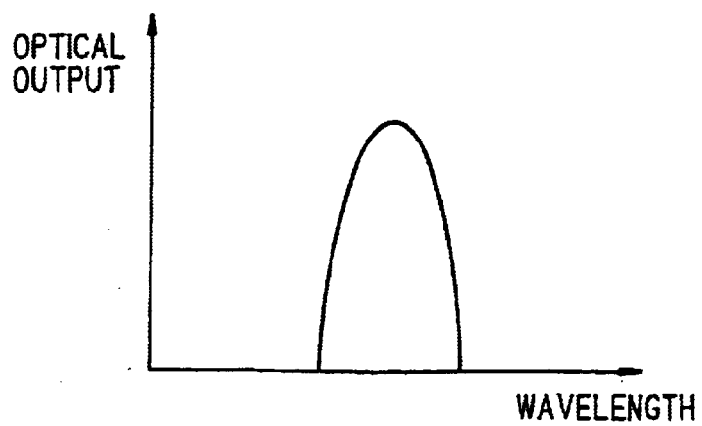
FIG. 18B is a first example of optical output characteristics of the arrayed waveguide grating device shown in FIG. 18A.
Figure 19A:
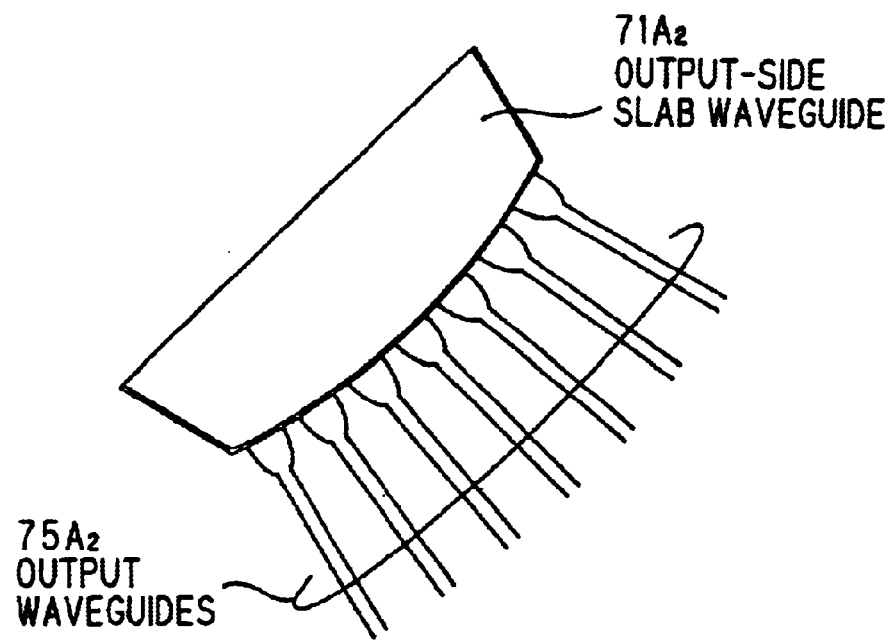
FIG. 19A is a diagram illustrating a region around the end face of the output-side slab waveguide in the sixth variant of the invention.
Figure 19B:
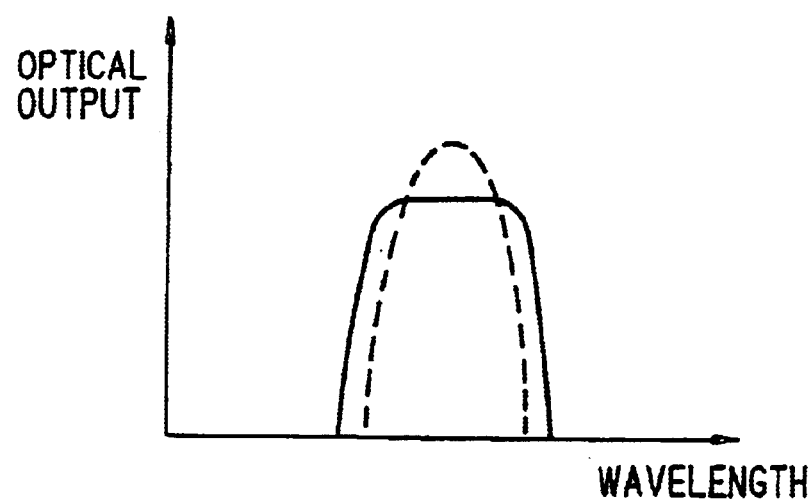
FIG. 19B is a second example of optical output characteristics of the arrayed waveguide grating device shown in FIG. 19A.
Figure 20A:
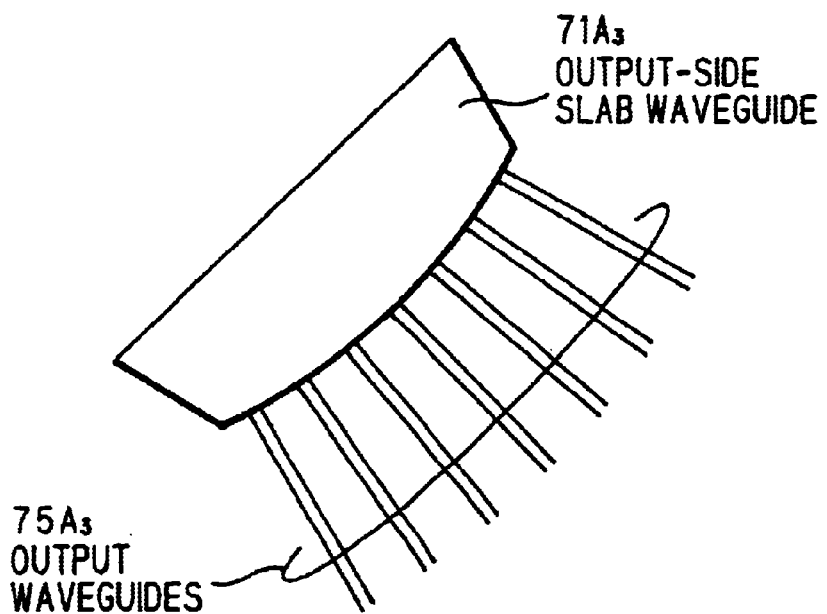
FIG. 20A is a diagram illustrating a region around the end face of the output-side slab waveguide in the sixth variant of the invention.
Figure 20B:
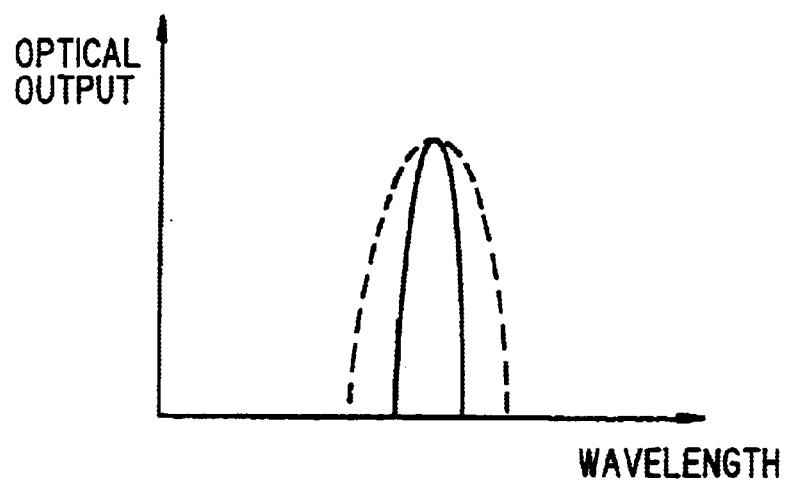
FIG. 20B is a third example of optical output characteristics of the arrayed waveguide grating device shown in FIG. 20A.

FIG. 17 is a diagram showing only the third component. FIGS. 18 to 20 are enlarged views of a region 152 around the end face of the output-side slab waveguide in a cut form shown in FIG. 17 (FIGS. 18A, 19A, and 20A), and show the optical output characteristics of these arrayed waveguide grating devices (FIGS. 18B, 19B, and 20B). For example, in FIG. 18A, the shape of the connection of the output waveguide $75A_1$ to the output-side slab waveguide $71A_1$ is intermediate between a further enlarged shape shown in FIG. 19A and a straight shape shown in FIG. 20A. Therefore, when the third component 143 using this output waveguide $71A_1$ is used, the use of a component having standard characteristics as the first component 141 can provide a spectrum of ordinary wavelength characteristics shown in FIG. 18B.

On the other hand, the use of the third component 143 using the output waveguide $75A_2$ as shown in FIG. 19A can provide a spectrum of wavelength characteristics such that the top portion is flat as indicated by a solid line in FIG. 19B. Further, the use of the third component 143 using the output waveguide $75A_3$ as shown in FIG. 20A can provide a spectrum of wavelength characteristics such that the top portion is steep as indicated by a solid line in FIG. 20B. Therefore, also in these cases, any one of the output waveguides $75A_1$ to $75A_3$ may be selected and used in the third component 143 according to the desired spectral form. It is a matter of course that the use of a combination of the first and third components 141, 143 can provide a wider variety of characteristics.

Seventh variant

FIGS. 21 to 24 show a portion around the output side of an output-side slab waveguide characterized by the number of ports and the arrangement of output wavelengths in a variant associated with the sixth variant. The output-side slab waveguides 71B$_1$ to 71B$_4$ in a cut form shown in these drawings are enlarged views of the region 152 around the end face of the output-side slab waveguide in the third component 143 shown in FIG. 17. FIGS. 25 to 28 respectively show output characteristics of arrayed waveguide grating devices using the output-side slab waveguides and the output waveguides shown in FIGS. 21 to 24.

Figure 21:
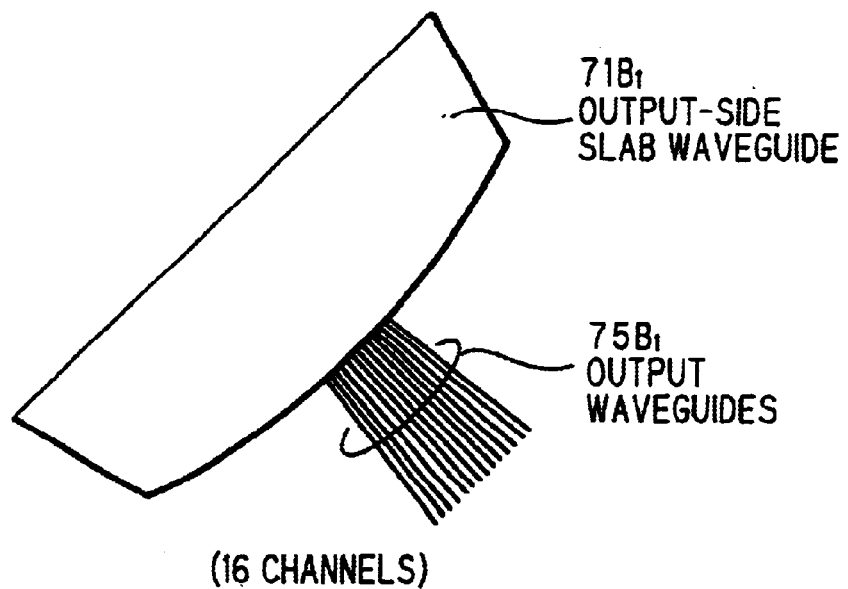
FIG. 21 is a plan view showing a part of an output-side slab waveguide and output waveguides of 16 channel AWG in a seventh variant of the invention.
Figure 22:
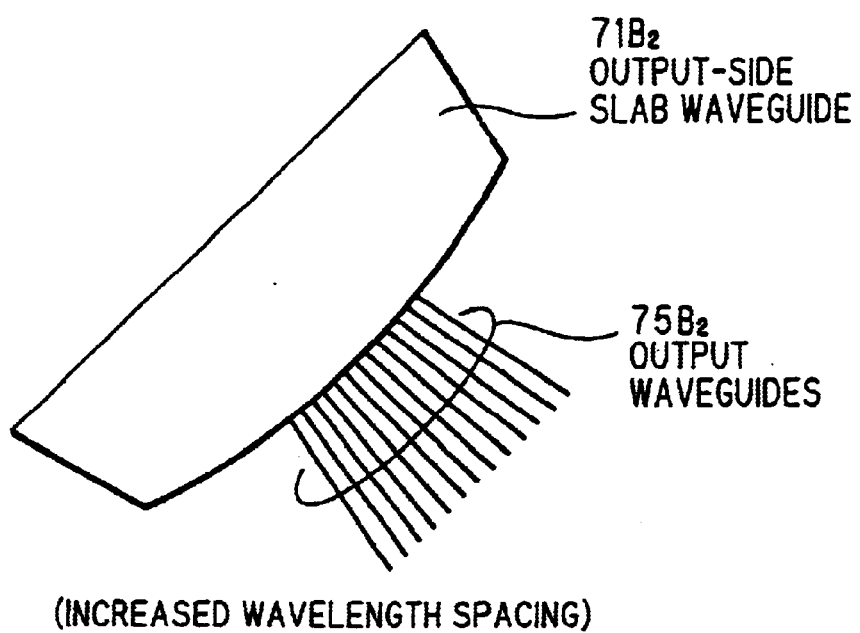
FIG. 22 is a plan view showing a part of an output-side slab waveguide and output waveguides in the seventh variant of the invention wherein the wavelength spacing has been increased.

Among them, in the embodiment shown in FIG. 21, a 16 channel output waveguide 75B$_1$ is connected to the output side of the output-side slab waveguide 71B$_1$. In the embodiment shown in FIG. 22, the 16 channels are arranged at wider spacings. Therefore, FIG. 25 corresponding to FIG. 21 and FIG. 26 corresponding to FIG. 22 are different from each other in spacing of peak positions of wavelengths of the optical output.

Figure 23:
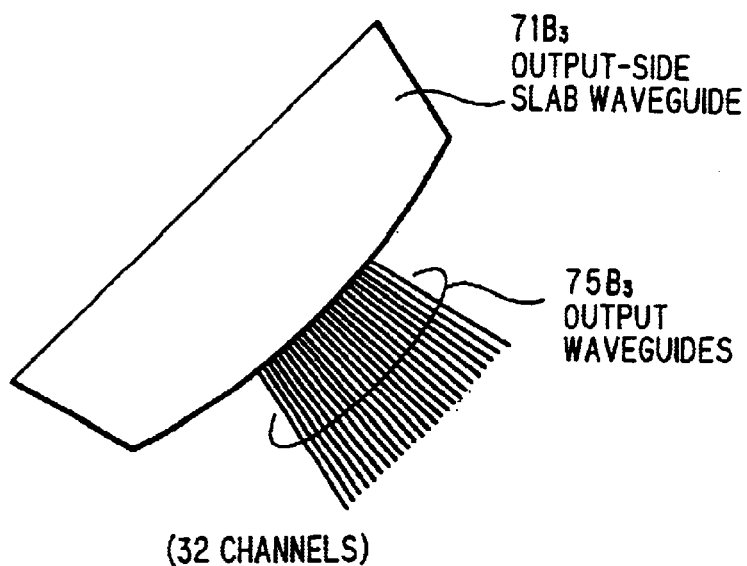
FIG. 23 is a plan view showing a part of an output-side slab waveguide and output waveguides of 32 channel AWG in the seventh variant of the invention.
Figure 27:
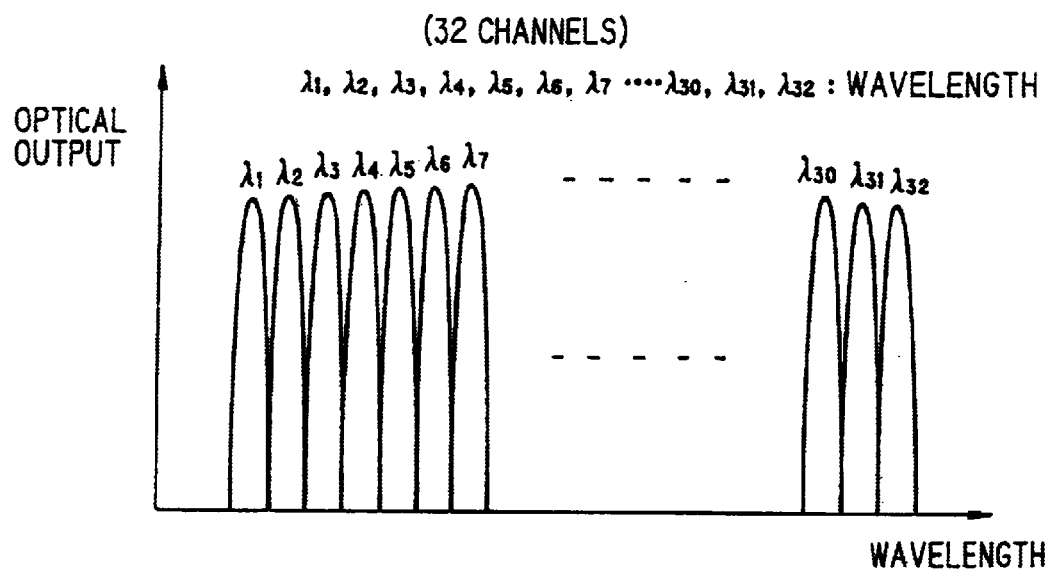
FIG. 27 is a diagram showing output characteristics of an arrayed waveguide grating device using the output-side slab waveguide and the output waveguides shown in FIG. 23.

On the other hand, the embodiment shown in FIG. 23 and the embodiment shown in FIG. 21 are identical to each other in arrangement density of the channels and are different from each other in that, in the embodiment shown in FIG. 23, the number of channels is doubled, that is, increased to 32. For this reason, as shown in FIG. 27, the waveband of the whole channel is doubled as compared with that in the case of the 16 channels shown in FIG. 25.

Figure 24:
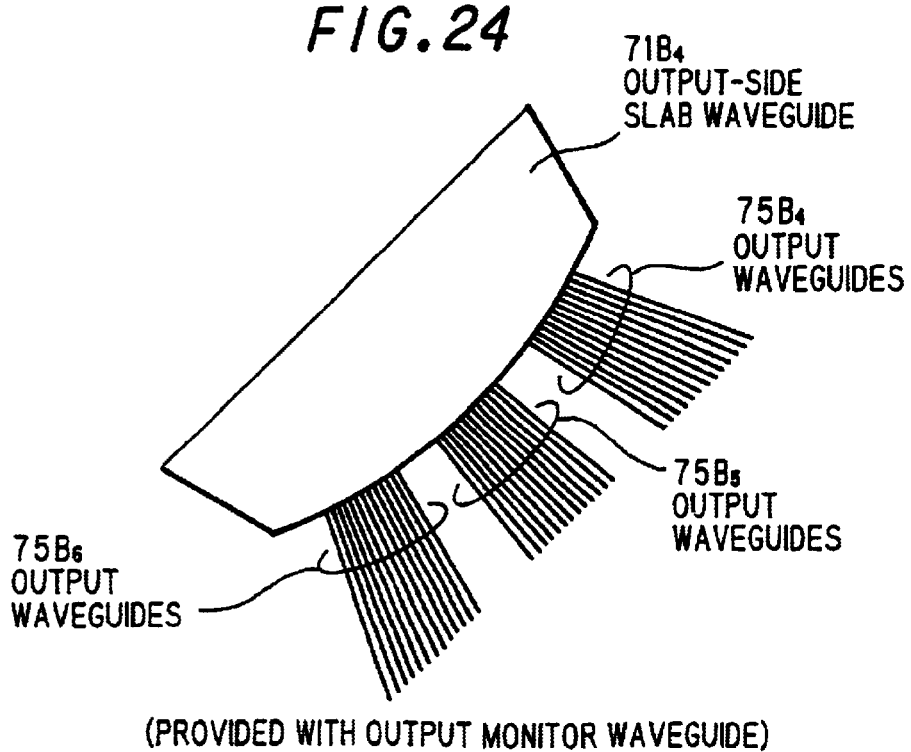
FIG. 24 is a plan view showing a part of an output-side slab waveguide and output waveguides in the seventh variant of the invention wherein output monitoring waveguides have been additionally provided.
Figure 25:
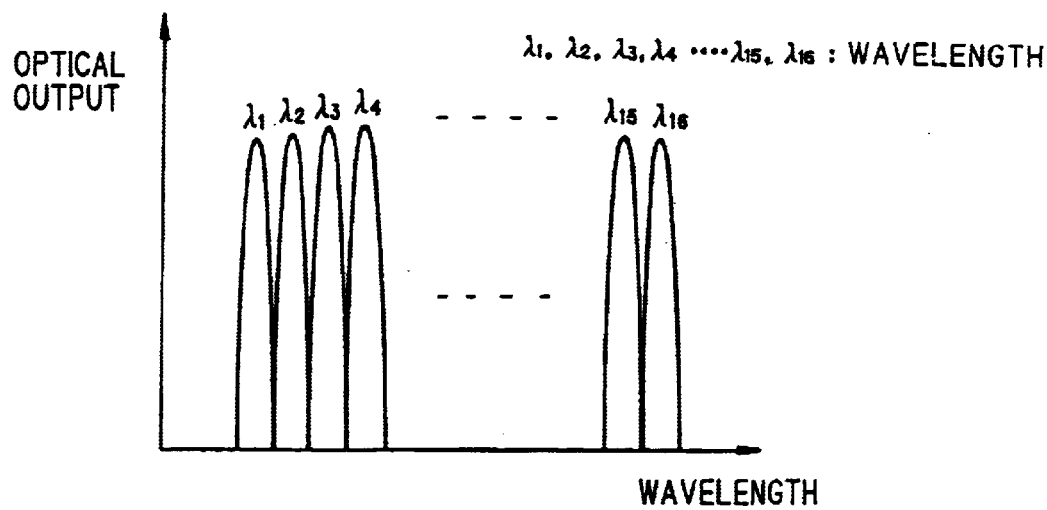
FIG. 25 is a diagram showing output characteristics of an arrayed waveguide grating device using the output-side slab waveguide and the output waveguides shown in FIG. 21.
Figure 26:
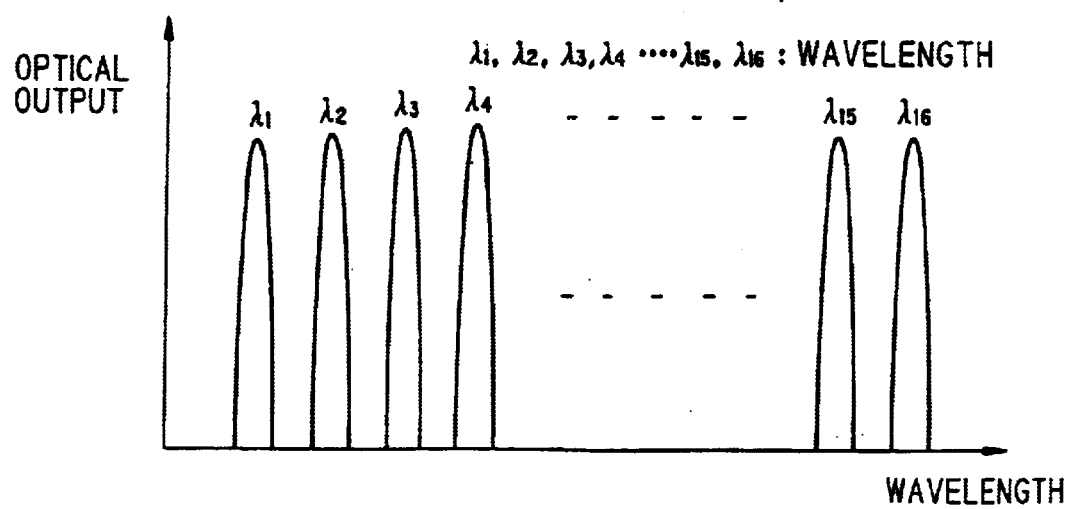
FIG. 26 is a diagram showing output characteristics of an arrayed waveguide grating device using the output-side slab waveguide and the output waveguides shown in FIG. 22.
Figure 28:
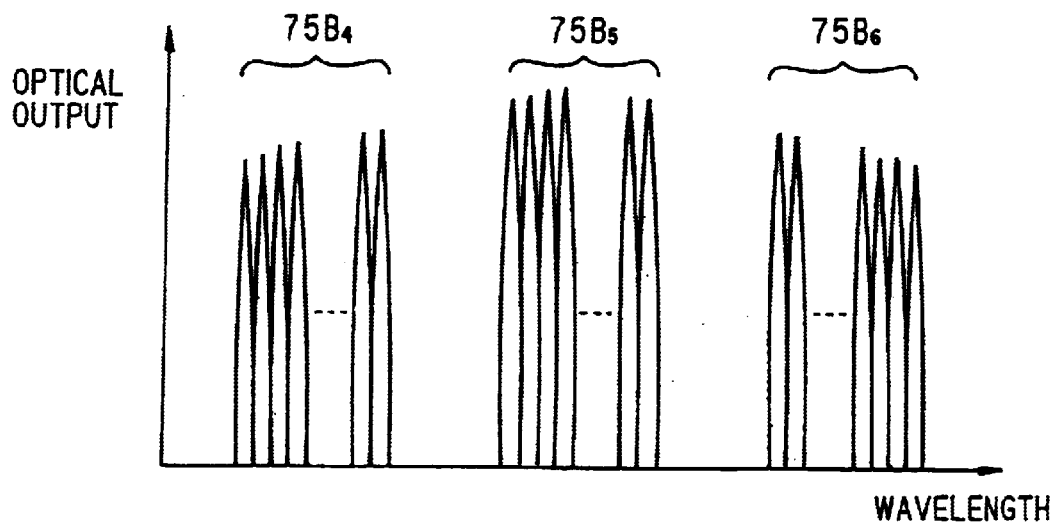
FIG. 28 is a diagram showing output characteristics of an arrayed waveguide grating device using the output-side slab waveguide and the output waveguides shown in FIG. 24.

In the embodiment shown in FIG. 24, an output waveguide 75B$_5$ is disposed around the center of the output side of the output-side slab waveguide 71B$_4$, and a pair of output waveguides 75B$_4$ and 75B$_4$ are disposed on respective sides of the output waveguide 75B$_5$ while leaving a predetermined space from the output waveguide 75B$_5$. The pair of output waveguides 75B$_4$ and 75B$_6$ are used for output monitoring purposes only. That is, as shown in FIG. 28 corresponding to FIG. 24, the optical output of the output waveguide 75B$_5$ is obtained from a relatively central portion on the output side of the output-side slab waveguide 71B$_4$ and thus has relatively good quality. This optical output is input into a main port (not shown) and is processed as ordinary signal light. On the other hand, the optical output of both or any one of the pair of output waveguides 75B$_4$, 75B$_6$ is input into a monitor port (not shown) and is used for monitoring, for example, for the control of signal light strength.

Eighth variant

FIG. 29 shows the shape of a portion around an input-side slab waveguide in an eighth variant which is suitable from the viewpoints of cutting and polishing. In this input-side slab waveguide 69C, a mask pattern is designed so that the slab length S is set in a length which is larger by a μm as the cutting margin and the polishing margin in the cutting site 181 than the necessary length. An input waveguide 74C for the input-side slab waveguide 69C comprises a first input waveguide 74C$_1$ connected to the center portion and second input waveguides 74C$_2$ which are connected respectively to both sides thereof while leaving a predetermined spacing from the center portion. The slab input end, to which the first input waveguide 74C$_1$ is connected, is projected toward the incident side by a μm from the portions to which the second input waveguides 74C$_2$ are connected.

FIG. 30 is a diagram showing a shape of a portion around the same input-side slab waveguide as used in the above preferred embodiment, for comparison with the input-side slab waveguide in the eighth variant of the invention. In this input-side slab waveguide 69D, as with the input-side slab waveguide 69C shown in FIG. 29, the slab length S is set in a length which is larger by a value corresponding to the cutting site 181. In this input-side slab waveguide 69D, the initial evaluation of the characteristics before cutting is impossible due to the large slab length S.

By contrast, in the variant shown in FIG. 29, the slab length S before cutting as measured from the slab input end, to which the first input waveguide 74C$_1$ is connected, is large. Therefore, as with the case of FIG. 29, the initial evaluation of characteristics in this portion is impossible. However, the connection site for the second input waveguides 74C$_2$ is located at a position which is a Mm shorter than the slab length S. Therefore, the initial evaluation of characteristics before cutting can be carried out using the second input waveguides 74C$_2$. An input-side slab waveguide 69C having good characteristics is selected, and, in use of the product, the first input waveguide 74C$_1$ may be selected.

Ninth variant

Figure 31:
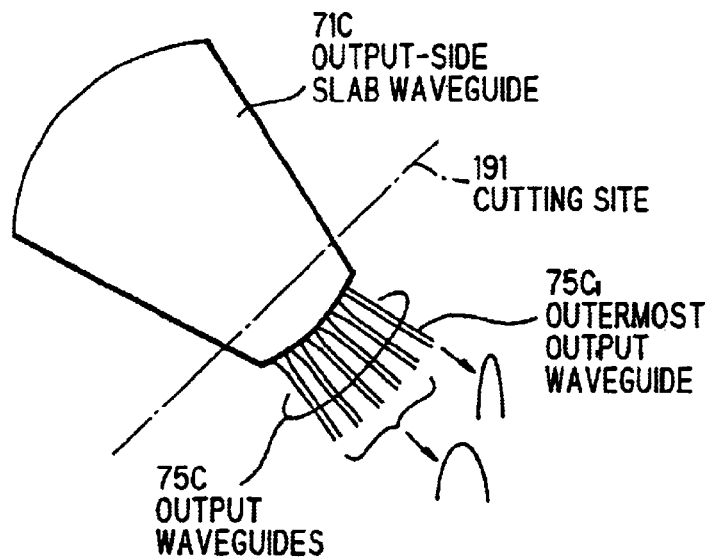
FIG. 31 is a plan view showing a shape around an output-side slab waveguide in an ninth variant of the invention.

FIG. 31 is a diagram showing a shape of a portion around an output-side slab waveguide in a ninth variant. In this output-side slab waveguide 71C, only an output waveguide 75C$_1$, which is located outermost in output waveguides 75C arrayed around a cutting site 191, has a straight shape in the connection to the output-side slab waveguide 71C and is used for spectral monitoring purposes. As explained in conjunction with FIGS. 18 and 20, since a light signal of a steep spectrum can be obtained from this output waveguide 75C$_1$, this portion can be used for monitoring purposes to satisfactorily improve the accuracy of positional correction at the time of bonding of the cut site 191. In this connection, it should be noted that the output waveguide 75C$_1$ for spectral monitoring purposes is not always required to have a straight shape. For example, the output waveguide 75C$_1$ for spectral monitoring purposes may be tapered so that the width is gradually narrowed toward the front end. Also in this case, a light signal of a steep spectral can be obtained.

Tenth variant

Figure 32:
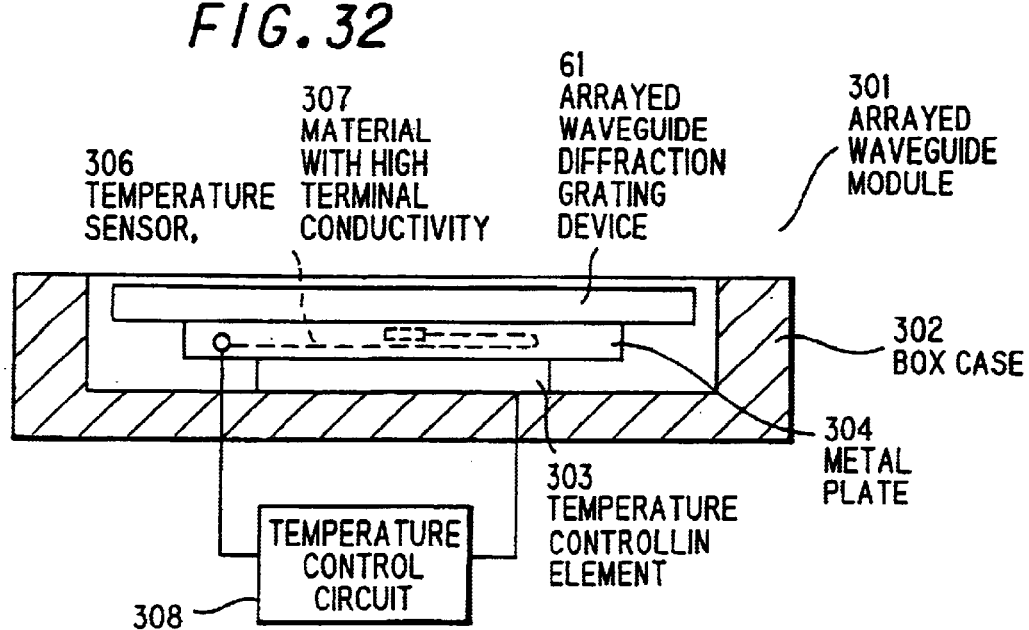
FIG. 32 is a side view showing an arrayed waveguide module in a tenth variant of the invention.

FIG. 32 shows an arrayed waveguide module in a tenth variant of the invention. This arrayed waveguide module 301 comprises a box-like case 302, a temperature controlling element 303 for heating or cooling, which is provided at the bottom of the case 302 and is formed of a Peltier element, the arrayed waveguide grating device 61 shown in FIG. 5, and a metal plate 304 interposed between the temperature controlling element 303 and the arrayed waveguide grating device 61. In this variant, a copper plate having high thermal conductivity is used as the metal plate 304. The metal plate 304 is larger than the contact size of the temperature controlling element 303 for broadening the temperature control region of the temperature controlling element 303.

A temperature sensor 306, together with a material 307 having high thermal conductivity, is embedded in the metal plate 304. This temperature detection output is input into a temperature control circuit 308 to perform the temperature control by the temperature controlling element 303. A thermistor is used in the temperature sensor 306. An input optical fiber (not shown) is connected to the input-waveguide side, and an output optical fiber (not shown) is connected to the output waveguide side.

Eleventh variant

Figure 33:
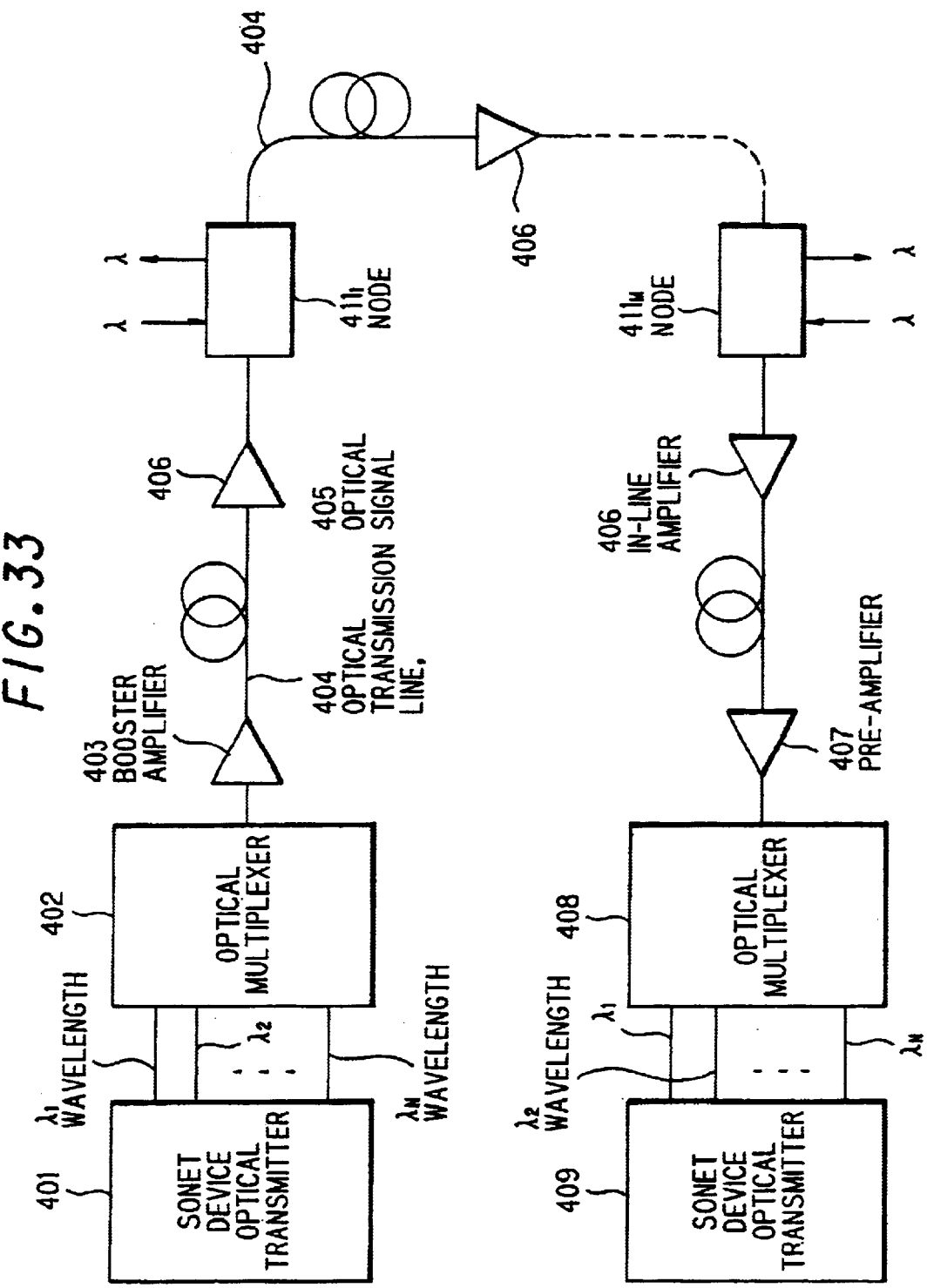
FIG. 33 is a system construction diagram showing the outline of the construction of an optical communication system in an eleventh variant of the invention.

FIG. 33 is a diagram showing the outline of the construction of an optical communication system in an eleventh variant. In this optical communication system, a light signal of N channels of wavelengths $\lambda_1$ to $\lambda_N$ sent from an SONET (synchronous optical network) device (optical transmitter) 401 disposed on the send side is multiplexed in an optical multiplexer (MUX) 402, and the multiplexed signal is the amplified with a booster amplifier 403 and is then sent to an optical transmission line 404. The optical multiplexer 402 is composed of an arrayed waveguide grating device. The multiplexed optical signal 405 is properly amplified with an in-line amplifier 406, is passed through an pre-amplifier 407, and is separated in an optical demultiplexer (DMUX) 408 into original wavelengths $\lambda_1$ to $\lambda_N$ which were then received by an SONET device (optical receiver) 409. A proper number of nodes (OADM) $411_1$ to $411_N$ are disposed along the optical transmission line 404. In these nodes $411_1$ to $411_N$, an optical signal of desired wavelengths is input thereinto and output therefrom.

Figure 34:
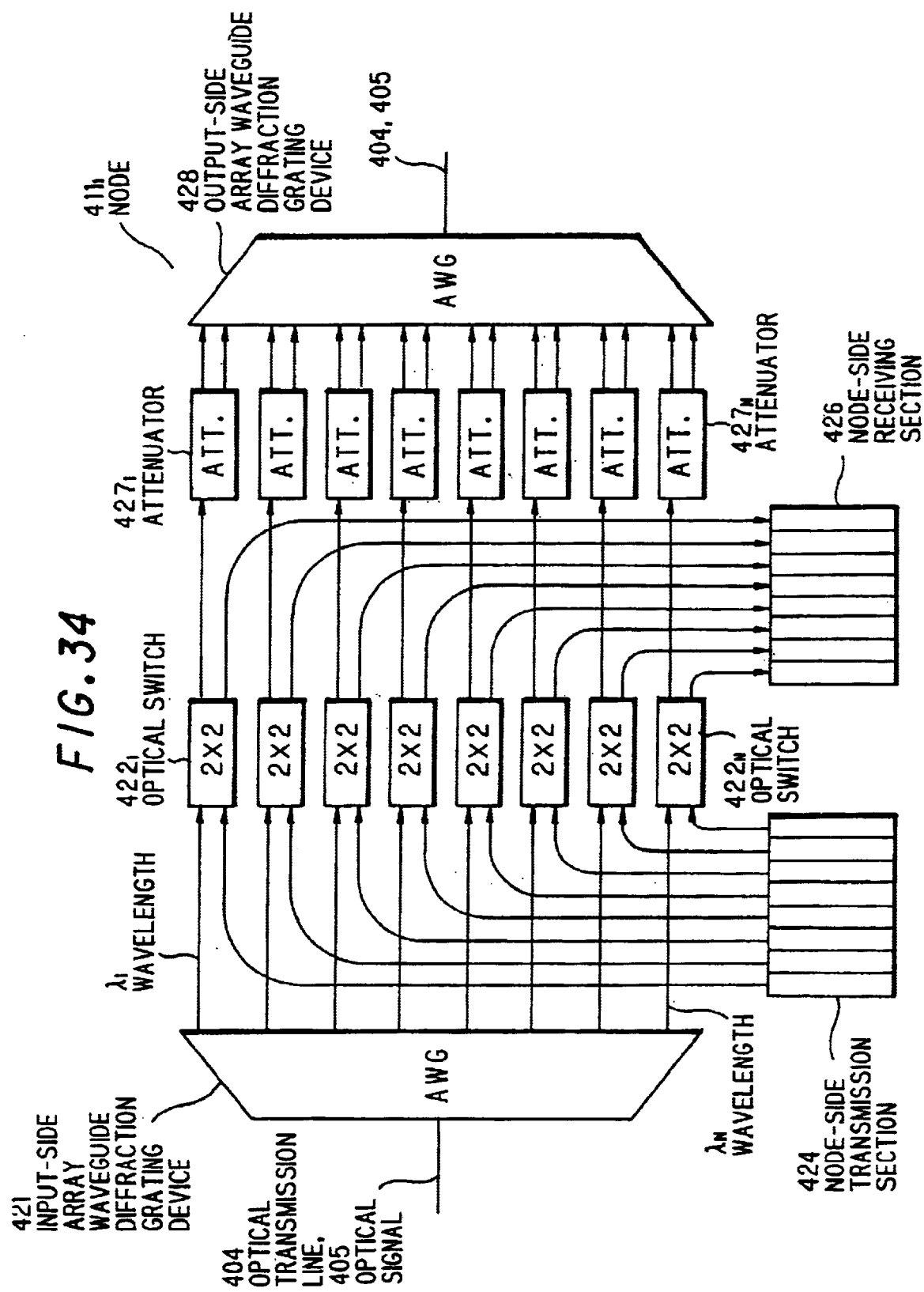
FIG. 34 is a block diagram showing the outline of the construction of a node used in the optical communication system of the eleventh variant of the invention.

FIG. 34 is a diagram showing the outline of the construction of a node. In FIG. 34, the first node $411_1$ is shown. The 2nd to Mth nodes $411_2$ to $411_N$ also have an principally identical construction. The optical signal 405 is input through the optical transmission line 404 shown in FIG. 33 into an input-side arrayed waveguide grating device 421 of the first node $411_1$, where the optical signal 405 is branched into an optical signal of N channels of wavelengths $\lambda_1$ to $\lambda_N$. The optical signal of wavelengths $\lambda_1$ to $\lambda_N$ are dropped in a node-side receiver 426 of the optical signal of wavelengths $\lambda_1$ to $\lambda_N$ by two-input two-output optical switches $422_1$ to $422_N$ provided for the wavelengths $\lambda_1$ to $\lambda_N$, and, in addition, the optical signal sent from a node-side transmitter 424 is added. The outputs of the two-input two-output optical switches $422_1$ to $422_N$ are subjected to gain adjustment by attenuators (ATTs) $427_1$ to $427_N$ provided so as to correspond respectively to the optical switches $422_1$ to $422_N$ and are then input into an output side arrayed waveguide grating device 428. The output-side arrayed waveguide grating device 428 is a device having a construction opposite to the construction of the input-side arrayed waveguide grating device 421 and functions to multiplex the optical signal of N channels of wavelengths $\lambda_1$ to $\lambda_N$ and to send the multiplexed signal as an optical signal 405 to an optical transmission line 404.

Thus, an arrayed waveguide grating device is used in the first node $411_1$ shown in FIG. 34 as well as the 2nd to Mth nodes $411_2$ to $411_x$, the optical multiplexer 402, and the optical demultiplexer 408 shown in FIG. 33. Therefore, under a demand for increasing the number of channels N of the optical signal 405, flatter optical frequency characteristics are required of the arrayed waveguide grating device.

Here regarding the arrayed waveguide grating device used in this variant, the arrayed waveguide grating device 61 shown in FIG. 5 may be used in at least a part thereof. This can offer the same effect as the preferred embodiment described above.

Finally, a deviation from the Rowland disposition involved in the above-described technique for cutting the slab waveguide according to the invention will be discussed.

Figure 35:
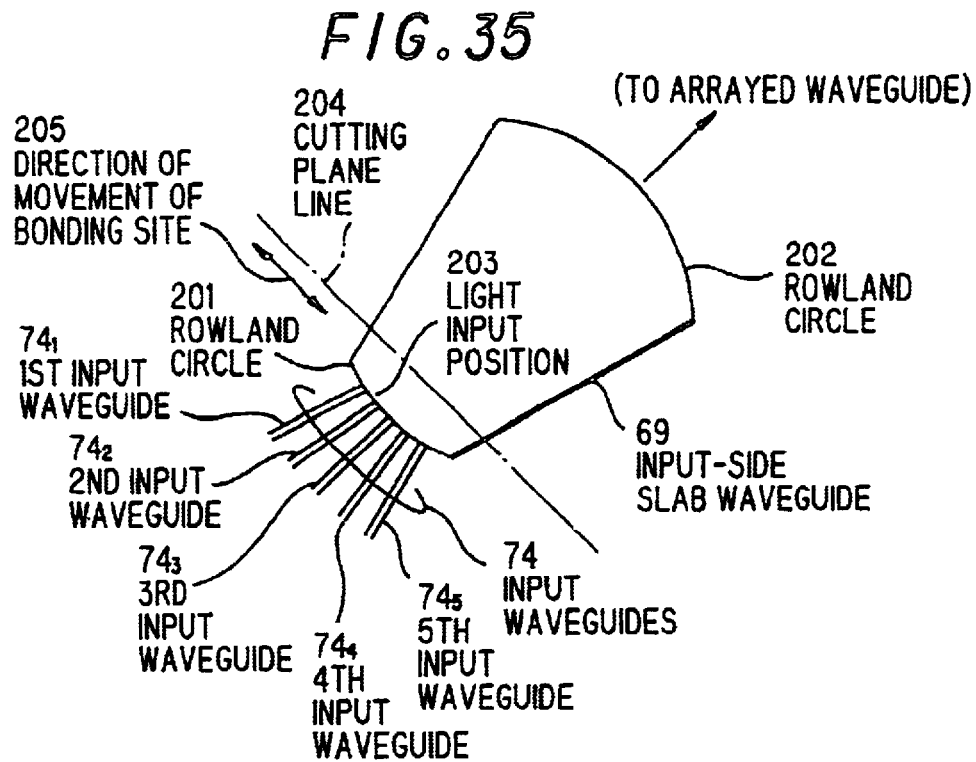
FIG. 35 is a diagram illustrating a portion around an input-side slab waveguide, for explaining a relationship with Rowland disposition.

FIG. 35 is a diagram showing a portion around the input-side slab waveguide. The interface of the input slab as the end of the input-side slab waveguide 69 in its side to which the input waveguide 74 is connected, constitutes a part of a Rowland circle 201.

It is assumed that the desired optical input position is a point indicated by an arrow 203 and the slab waveguide 69 is cut at a position indicated by a cutting plane line 204. Further, assuming that the input waveguide 74 is constituted by the first to fifth input waveguides $74_1$ to $74_5$, when the bonding position is moved in a direction indicated by an arrow 205 at a position indicated by a cutting plane line 204 to move the third input waveguide $74_3$ to a point indicated by an arrow 203, the angle is relatively greatly deviated from the original Rowland disposition. However, when the input waveguide 74 is composed of a plurality of input waveguides as in the case of this embodiment, the introduction of light from the second input waveguide $74_2$, which is closest to the point indicated by the arrow 203, and the movement thereof to this point can minimize the deviation of angle. The angle deviation mainly affects the loss value.

Figure 36:
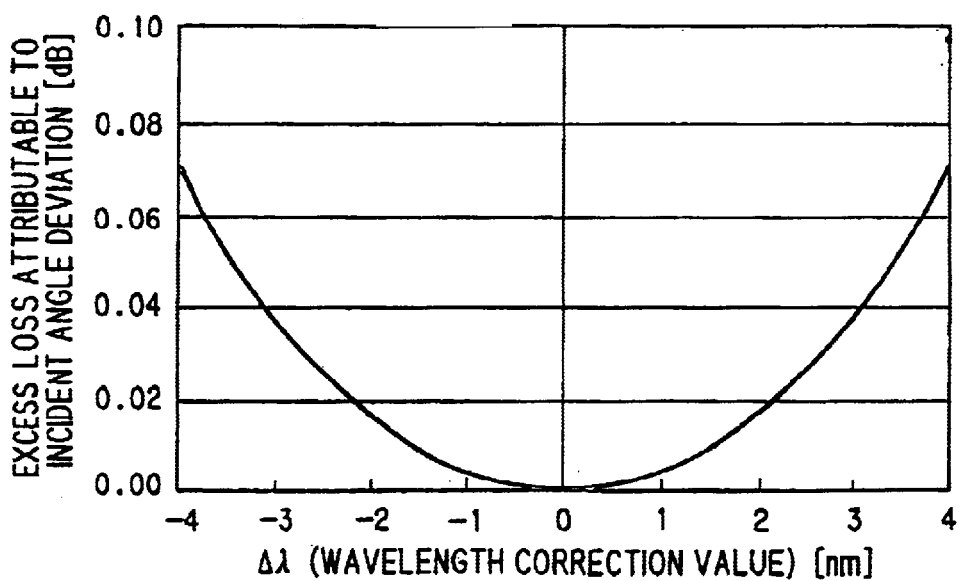
FIG. 36 is a characteristic diagram showing an example of the results of calculation of excess loss attributable to the incident angle deviation in input waveguides.

FIG. 36 shows an example of the results of calculation of excess loss attributable to the angle deviation of the above-described input waveguide. The numerical values indicated here, of course, vary according to each design parameter in designing the arrayed waveguide. In FIG. 36, light is introduced into the third input waveguide $74_1$ shown in FIG. 35, and the third input waveguide $74_1$ is moved in a direction indicated by the arrow 205 to perform center wavelength correction. The drawing shows that, as the wavelength correction value ($\Delta\lambda$) increases, the excess loss caused thereby becomes not negligible.

As described above, in the embodiment shown in FIG. 35, the loss attributable to the angle deviation can be reduced by introducing light into the second input waveguide $74_2$ to perform correction. This technique is impossible in the construction of the conventional arrayed waveguide grating device shown in FIGS. 2 and 3. This technique has become possible for the first time by the invention wherein the slab waveguide 69 is cut into two parts which are then fixed to each other, or alternatively cut components are fixed to each other.

As is apparent from the foregoing description, according to the first feature of the invention, an input-side slab waveguide provided on an identical substrate is cut into a first input-side slab waveguide and a second input-side slab waveguide which are fixed to each other in such a state that the cut faces have been relatively moved by a desired degree, thereby realizing an arrayed waveguide grating device. Alternatively, a first input-side slab waveguide and a second input-side slab waveguide, each having such a structure that has been formed by the above cutting, are prepared on an identical substrate or respective separate substrates, and the end faces, in the structure such that has been formed by cutting, are fixed to each other in such a state that the cut faces have been relatively moved by a desired degree according to need, thereby realizing an arrayed waveguide grating device. Therefore, the fixation of the cut or end faces to each other, in such a state that the cut or end faces have been relatively moved by a desired degree in an analog manner, can realize wavelength correction on the input side with high accuracy. Further, since two components are fixed to each other to constitute one arrayed waveguide grating device, the yield can be improved as compared with the case where the arrayed waveguide grating device is produced as a single component.

According to the second feature of the invention, an output-side slab waveguide provided on an identical substrate is cut into a first output-side slab waveguide and a second output-side slab waveguide which are fixed to each other in such a state that the cut faces have been relatively moved by a desired degree, thereby realizing an arrayed waveguide grating device. Alternatively, a first output-side slab waveguide and a second output-side slab waveguide, each having such a structure that has been formed by the above cutting, are prepared on an identical substrate or respective separate substrates, and the end faces, in the structure such that has been formed by cutting, are fixed to each other in such a state that the cut faces have been relatively moved by a desired degree according to need, thereby realizing an arrayed waveguide grating device.

Therefore, the fixation of the cut or end faces to each other, in such a state that the cut or end faces have been relatively moved by a desired degree in an analog manner, can realize wavelength correction on the output side with high accuracy. Further, the selection of various output-side slab waveguides can realize, for example, a change in the number of channels on the output side. Furthermore, since two components are fixed to each other to constitute one arrayed waveguide grating device, the yield can be improved as compared with the case where the arrayed waveguide grating device is produced as a single component, The arrayed waveguide grating device according to the third feature of the invention comprises three components in total divided at the input-side slab waveguide and the output-side slab waveguide. These components are fixed to one another in such a manner that the cut faces, in such a structure that has been formed by cutting, are moved by a desired degree, thereby realizing an arrayed waveguide grating device. Therefore, the fixation, in such a state that the end faces in one of or both the two fixation sites have been moved by a desired degree in an analog manner, can realize wavelength correction with high accuracy. Further, the selection of various output-side slab waveguides can realize, for example, a change in the number of output-side channels. Furthermore, since three components are fixed to one another to constitute one arrayed waveguide grating device, the yield can be improved as compared with the case where the arrayed waveguide grating device is produced as a single component. In addition, since the second substrate constituting the channel waveguide array disposed between the input-side slab waveguide and the output-side slab waveguide is required to have higher accuracy than the other substrates, an improvement in yield and a reduction in cost can be realized, for example, by producing only the second substrate according to a production process having high accuracy, producing the first and third substrates according to a production process having relatively low accuracy, and combining these three substrates to constitute one arrayed waveguide grating device.

In arrayed waveguide grating devices according to the first to third features of the invention, when the cut site is a face which has been slightly deviated in a predetermined direction on a three-dimensional space from a face perpendicular to the optical axis, the reflecting face is rendered not perpendicular to the optical axis and, thus, the adverse effect of reflection can be simply eliminated.

In the arrayed waveguide grating devices according to the first to third features of the invention, the reinforcement of the cut site with a dolly can facilitate cutting, polishing, and fixation and, in addition, can maintain the strength after the fixation.

In the arrayed waveguide grating devices according to the first to third features of the invention, when an UV-curable resin is used as the adhesive, the use of a transparent device substrate material having high ultraviolet light transmission can realize efficient production.

According to the fourth and fifth features of the invention, since the arrayed waveguide grating device according to the first feature of the invention is produced using an identical substrate, there is no need to consider a production error attributable to the use of different substrates.

According to the sixth feature of the invention, a plurality of substrates, in such a form that an input-side slab waveguide has been divided into a plurality of parts, are previously prepared and are then used in proper combination to produce a desired arrayed waveguide grating device. Therefore, the yield can be improved.

According to the seventh feature of the invention, a plurality of substrates, in such a form that an output-side slab waveguide has been divided into a plurality of parts, are previously prepared and are used in proper combination to produce a desired arrayed waveguide grating device. According to this construction, the yield can be improved, and, in addition, arrayed waveguide grating devices having functions or characteristics can be produced.

In the arrayed waveguide grating device according to the second or third feature of the invention, when the second output-side slab waveguide is selected as desired from second output-side slab waveguides which are different from each other in the number of output waveguides connected thereto, a desired number of channels can be selected from these second output-side slab waveguides, and, thus, the invention can also be used in applications other than the wavelength correction.

In the arrayed waveguide grating device according to the second or third feature of the invention, when the second output-side slab waveguide is constructed as a second output-side slab waveguide such that at least one of output waveguides connected thereto is allocated to a port for monitoring, the selection of this output-side slab waveguide, for example, can facilitate wavelength correction, improve the accuracy of the wavelength correction, and can limit the output.

In the arrayed waveguide grating device according to the first or third feature of the invention, preferably, a plurality of the first substrates, which are different from each other in a part or the whole of the shape of connection of the input waveguide to the first input-side slab waveguide, are provided for selective connection to the second substrate. Therefore, when one substrate is selected from the plurality of first substrates and connected to the second substrate, various types can be selected as desired which are different from each other in a part or the whole of the shape of connection of the input waveguide to the first input-side slab waveguide such that the connection has a widened or narrowed shape. In this case, for example, the selection of a spectral form can realize an arrayed waveguide grating device having desired characteristics.

In arrayed waveguide grating device according to the second feature of the invention, preferably, a plurality of the second substrates, which are different from each other in a part or the whole of the shape of connection of the output waveguide to the second output-side slab waveguide, are provided for selective connection to the first substrate. Therefore, when one substrate is selected from the plurality of second substrates and connected to the first substrate, various types can be selected as desired which are different from each other in a part or the whole of the shape of connection of the output waveguide to the second output-side slab waveguide such that the connection has a widened or narrowed shape. In this case, for example, the selection of a spectral form can realize an arrayed waveguide grating device having desired characteristics.

In arrayed waveguide grating device according to the third feature of the invention, preferably, a plurality of the third substrates, which are different from each other in a part or the whole of the shape of connection of the output waveguide to the second output-side slab waveguide, are provided for selective connection to the second substrate. Therefore, when one substrate is selected from the plurality of third substrates and connected to the second substrate, various types can be selected as desired which are different from each other in a part or the whole of the shape of connection of the output waveguide to the second output-side slab waveguide such that the connection has a widened or narrowed shape. In this case, for example, the selection of a spectral form can realize an arrayed waveguide grating device having desired characteristics.

In the arrayed waveguide grating device according to the first or third feature of the invention, preferably, a monitoring input waveguide used for monitoring an output before cutting the input-side slab waveguide into the first input-side slab waveguide and the second input-side slab waveguide is provided adjacent to the input waveguide and connected to the first input-side slab waveguide and the input waveguide portion other than the monitoring input waveguide is projected toward the input side by a length corresponding to a reduction in the slab length upon cutting of the slab waveguide into the first input-side slab waveguide and the second input-side slab waveguide or polishing of the cut faces. According to this construction, before cutting of the input-side slab waveguide, the device can be examined with high accuracy through the monitoring input waveguide. This can reject inferior products. Further, also after cutting of the input-side slab waveguide into two parts which are then joined to each other, a necessary slab length can be ensured.

In the embodiment of the arrayed waveguide grating device according to the second or third feature of the invention wherein a second output-side slab waveguide, such that at least one of output waveguides connected thereto is allocated to a port for monitoring, is provided, the monitoring port may be a spectral monitoring port which provides an optical signal of a more steep spectrum than other port connected to the second output-side slab waveguide. According to this construction, for example, the accuracy of the positional correction at the time of the fixation of the cut sites in the slab waveguide can be satisfactorily improved.

In the embodiment of the arrayed waveguide grating device according to the second or third feature of the intention wherein a second output-side slab waveguide, such that at least one of output waveguides connected thereto is allocated to a port for monitoring, is provided, the monitoring channel may be a power monitoring port which detects the power of a specific port connected to the second output-side slab waveguide. In this case, for example, even when measurement with the specific port is impossible, the power can be monitored by using this power monitoring port.

According to the eighth feature of the invention, the first end face of the first substrate has been fixed to the second end face of the second substrate so that light, which has emerged from the input-side waveguide and entered the first input-side slab waveguide, is optically coupled to the channel waveguide array through the second slab waveguide. The fixation of these end faces, in such a state that the end faces have been moved according to need, can realize wavelength correction on the input side with high accuracy. Further, since two components are fixed to each other to constitute one arrayed waveguide grating device, the yield can be improved as compared with the arrayed waveguide grating device is produced as a single component.

The ninth feature of the invention provides an arrayed waveguide module using the arrayed waveguide grating device according to the first feature of the invention. According to the construction of the ninth feature of the invention, the wavelength correction on the input side can be carried out with high accuracy. Further, since two components are fixed to each other to constitute one arrayed waveguide grating device, the yield can be improved as compared with the arrayed waveguide grating device is produced as a single component.

The tenth feature of the invention provides an arrayed waveguide module using the arrayed waveguide grating device according to the eighth feature of the invention. According to the construction of the tenth feature of the invention, the fixation of the first and second faces, in such a state that the end faces have been moved according to need, can realize wavelength correction on the input side with high accuracy. Further, since two components are fixed to each other to constitute one arrayed waveguide grating device, the yield can be improved as compared with the arrayed waveguide grating device is produced as a single component.

The eleventh feature of the invention provides an optical communication system using the arrayed waveguide grating device according to the first feature of the invention. According to the construction of the eleventh feature of the invention, for these arrayed waveguide grating devices, the wavelength correction on the input side can be carried out with high accuracy. Further, since two components are fixed to each other to constitute one arrayed waveguide grating device, as compared with the arrayed waveguide grating device is produced as a single component, the yield can be improved and the cost of the system can be reduced.

The twelfth feature of the invention provides an optical communication system using the arrayed waveguide grating device according to the eighth feature of the invention. According to the construction of the twelfth feature of the invention, for these arrayed waveguide grating devices, the wavelength correction on the input side can be carried out with high accuracy. Further, in these arrayed waveguide grating devices, since two components are fixed to each other to constitute one arrayed waveguide grating device, as compared with the arrayed waveguide grating device is produced as a single component, the yield can be improved and the cost of the system can be reduced.

The invention has been described in detail with particular reference to preferred embodiments, but it will be understood that variations and modifications can be effected within the scope of the invention as set forth in the appended claims.

What is claimed is:

1. An arrayed waveguide grating device comprising:
    a plurality of input waveguides on a first substrate, wherein said first substrate comprises a cut face;
    a first portion of an input-side slab waveguide connected to the input waveguides, wherein said first portion of said input-side slab waveguide comprises a cut face which is coincident with the cut face of said first substrate;
    a second portion of an input-side slab waveguide on a second substrate, wherein said second substrate comprises a cut face which is coincident with a cut face of said second portion of said input-side slab waveguide, said cut face of said second portion of said input-side slab waveguide being fixed to the cut face of said first portion of said input-side slab waveguide to form an input-side slab waveguide;
    a channel waveguide, array on the second substrate and connected to said second portion of said input-side slab waveguide comprising channel waveguides each having a successively increased length in a predetermined waveguide length increment;
    an output waveguide on the second substrate;
    an output-side slab waveguide on the second substrate that connects the channel waveguide array to the output waveguide; and a dolly reinforcing connection of said cut faces of said first portion and said second portion of said input-side slab waveguide.

2. An arrayed waveguide grating device comprising:
an input waveguide on a first substrate, wherein the first substrate comprises a cut face;
a channel waveguide array on the first substrate and comprising channel waveguides each having a successively increased length in a predetermined waveguide length increment;
an input-side slab waveguide on the first substrate that connects the input waveguide to the channel waveguide array;
a first portion of an output-side slab waveguide on the first substrate and connected to the channel waveguide array, wherein said first portion of said output-side slab waveguide comprises a cut face which is coincident with said cut face on said first substrate;
a second portion of an output-side slab waveguide on a second substrate, wherein said second portion of said output-side slab waveguide comprises a cut face which is coincident with a cut face of said second substrate, said cut face of said second portion of said output-side slab waveguide being fixed to the cut face of said first portion of said output-side slab waveguide to form an output-side slab waveguide; and
a plurality of output waveguides on the second substrate connected to the second portion of said output-side slab waveguide, wherein the second portion of said output-side slab waveguide is selectable as from a plurality of second portions of output-side slab waveguides which are different from each other in the number of output waveguides connected thereto.

3. An arrayed waveguide grating device comprising:
an input waveguide on a first substrate, wherein the first substrate comprises a cut face;
a channel waveguide array on the first substrate and comprising channel waveguides each having a successively increased length in predetermined waveguide length increment;
an input-side slab waveguide on the first substrate that connects the input waveguide to the channel waveguide array;
a first portion of an output-side slab waveguide on the first substrate and connected to the channel waveguide array, wherein said first portion of said output-side slab waveguide comprises a cut face which is coincident with said cut face on said first substrate;
a second portion of an output-side slab waveguide, on a second substrate, wherein said second portion of said output-side slab waveguide comprises a cut face which is coincident with a cut face of said second substrate, said cut face of said second portion of said output-side slab waveguide being fixed to the cut face of said first portion of said output-side slab waveguide to form an output-side slab waveguide; and
a plurality of output waveguides on the second substrate connected to the second portion of said output-side slab waveguide, wherein the second portion of said output-side slab waveguide comprises a main port connected to one of said plurality of output waveguides and a monitoring port positioned outside of said main port and connected to another of said plurality of output waveguides.

4. The arrayed waveguide grating device of claim 3, wherein the monitoring port comprises a spectral monitoring port which provides at optical signal having a steeper spectrum than another port of the second output-side slab waveguide.

5. The arrayed waveguide grating device of claim 3, wherein the monitoring port comprises a power monitoring port which obtains an optical signal corresponding to a specific port connected to the second output-side slab waveguide to detect the power of the specific port.

6. An arrayed waveguide grating device comprising:
a plurality of input waveguide on a first substrate, wherein the first substrate comprises a cut face;
a first portion of an input-side slab waveguide connected to the input waveguides and comprising a cut face which is coincident with the cut face of said first substrate;
a second portion of an input-side, slab waveguide on a second substrate, wherein said second substrate comprises a cut face which is coincident with a cut face of said second portion of said input-side slab waveguide, said cut face of said second portion of said input-side slab waveguide being fixed to the cut face of said first portion of said input-side slab waveguide to form input-side slab waveguide;
a channel waveguide array on the second substrate and connected to said second portion of said input-side slab waveguide comprising channel waveguides each having a successively increased length in a predetermined waveguide length increment;
an output waveguide on the second substrate;
an output-side slab waveguide on the second substrate that connects the channel waveguide way to the output waveguide; and
a plurality of first substrates, which are different from each other in the shape of connection of the input waveguides to the first portion of said input-side slab waveguide for selective connection to the second substrate.

7. An arrayed waveguide grating device comprising:
an input waveguide on a first substrate, wherein the first substrate comprises a cut face;
channel waveguide array on the first substrate and comprising channel waveguides each having a successively increased length in a predetermined waveguide length increment;
an input-side, slab waveguide on the first substrate that connects the input waveguide to the channel waveguide array;
a first portion of an output-side slab waveguide on the first substrate and connected to the channel waveguide array, wherein said first portion of said output-side slab waveguide comprises a cut face which is coincident with said cut face on said first substrate;
a second portion of an output-side slab waveguide on a second substrate, wherein said second portion of said output-side slab waveguide comprises a cut face which is coincident with a cut face of said second substrate, said cut face of said second portion of said output-side slab waveguide being fixed to the cut face of said first portion of said output-side slab waveguide to form an output-side slab waveguide;
a plurality of output waveguides on the second substrate connected to the second portion of said output-side slab waveguide; and
a plurality of second substrates, which are different from each other in the shape of connection of the output waveguides to the second portion of said output-side slab waveguide for selective connection to the first substrate.

8. An arrayed waveguide grating device comprising;

a first input waveguide and a second input waveguide on a first substrate;

a first portion of an input-side slab waveguide connected to the input waveguides and comprising a cut face which is coincident with the cut face of said first substrate;

a second portion of said input-side slab waveguide on a second substrate, wherein said second substrate comprises a cut face which is coincident with a cut face of said second portion of said input-side slab waveguide, said cut face of said second portion of said input-side slab waveguide being fixed to the cut face of said first portion of said input-side slab waveguide to form an input-side slab waveguide;

a channel waveguide array on the second substrate connected to said second portion of said input-side slab waveguide and comprising channel waveguides each having a successively increased length in a predetermined waveguide length increment;

a first portion of an output-side slab waveguide on the second substrate and connected to the channel waveguide array, wherein said second substrate comprises a cut face which is coincident with a cut face of said first portion of said output-side slab waveguide;

a second portion an output-side slab waveguide on a third substrate, wherein said third substrate comprises a cut face which is coincident with a cut face of said second portion of said output-side slab waveguide, said cut face of said second portion of said output-side slab waveguide being fixed to the cut face of said first portion of said output-side slab waveguide to form an output-side slab waveguide;

a plurality of output waveguides on the third substrate connected to the second portion of said output-side slab waveguide; and a plurality of third substrates, which are different from each other in the shape of connection of the output waveguides to the second portion of said output-side slab waveguide for selective connection to the second substrate.

9. An arrayed waveguide grating device comprising:

a plurality of input waveguides on a first substrate, wherein the first substrate comprises a cut face;

a first portion of an input-side slab waveguide connected to the input waveguides and comprising a cut face which is coincident with the cut face of said first substrate, a second portion of an input-side slab waveguide on a second substrate, wherein said second substrate comprises a cut face which is coincident with a cut face of said second portion of said input-side slab waveguide, said cut face of said second portion of said input-side slab waveguide being fixed to the cut face of said first portion of said input-side slab waveguide to form an input-side slab waveguide;

a channel waveguide array on the second substrate and connected to said second portion of said input-side slab waveguide comprising channel waveguides each having a successively increased length in a predetermined waveguide length increment;

an output waveguide on the second substrate; and an output-side slab waveguide on the second substrate that connects the channel waveguide array to the output waveguide, wherein one of said plurality of input waveguides comprises a monitoring input waveguide connected to the input waveguide portion other than a projecting portion which projects toward the input side by a length corresponding to a reduction in the slab length upon one of cutting of the slab waveguide into the first portion of said input-side slab waveguide and the second portion of said input-side slab waveguide or polishing of the cut faces.

10. An arrayed waveguide grating device comprising:

an input waveguide on a first substrate, wherein the first substrate comprises a cut face;

a channel waveguide array on the first substrate and comprising channel waveguides each having a successively increased length in a predetermined waveguide length increment;

an input-side slab waveguide on the first substrate that connects the input waveguide to the channel waveguide array;

a first portion of an output-side slab waveguide on the first substrate and connected to the channel waveguide array, wherein said first portion of said output-side slab waveguide comprises a cut face which is coincident with said cut face on said first substrate;

a second portion of an output-side slab, waveguide on a second substrate wherein said second portion of said output-side slab waveguide comprises a cut face which is coincident with a cut face of said second substrate, said cut face of said second portion of said output-side slab waveguide being fixed to the cut face of said first portion of said output-side slab waveguide to form an output-side slab waveguide;

a plurality of output waveguides on the second substrate connected to the second portion of said output-side slab waveguide; and a dolly reinforcing connection of said cut faces of said first portion and said second portion of one of said input side slab waveguide and said output-side slab waveguide.

11. An arrayed waveguide grating device comprising:

a first input waveguide and a second input waveguide on a first substrate;

a first portion of an input-side slab waveguide connected to the input waveguides and comprising a cut face which is coincident with the cut face of said first substrate;

a second portion of said input-side slab waveguide on a second substrate, wherein said second substrate comprises a cut face which is coincident with a cut face of said second portion of said input-side slab waveguide, said cut face of said second portion of said input-side slab waveguide being fixed to the cut face of said first portion of said input-side slab waveguide to form an input-side slab waveguide;

a channel waveguide array on the second substrate connected to said second portion of said input-side slab waveguide and comprising channel waveguides each having a successively increased length in a predetermined waveguide length increment;

a first portion of an output-side slab waveguide on the second substrate and connected to the channel waveguide array, wherein said second substrate comprises a cut face which is coincident with a cut face of said first portion of said output-side slab waveguide;

a second portion an output-side slab waveguide on a third substrate, wherein said third substrate comprises a cut face which is coincident with a cut face of said second portion of said output-side slab waveguide, said cut face of said second portion of said output-side slab waveguide being fixed to the cut face of said first portion of said output-side slab waveguide to form an output-side slab waveguide;

a plurality of output waveguides on the third substrate connected to the second portion of said output side slab waveguide; and a dolly reinforcing connection of said cut face of said first portion and said second portion of one of said input side slab waveguide and said output-side slab waveguide.

12. An arrayed waveguide grating device comprising:

a first waveguide and a second input waveguide on a first substrate;

a first portion of an input-side slab waveguide connected to the input waveguides and comprising a cut face which as coincident with the cut face of said first substrate;

a second portion of said input-side slab waveguide on a second substrate wherein said second substrate comprises a cut face which is coincident with a cut face of said second portion of said input-side slab waveguide, said cut face of said second portion of said input-side slab waveguide being fixed to the cut face of said first portion of said input-side slab waveguide to form an input-side slab waveguide;

a channel waveguide array on the second substrate connected to said second portion of said input-side slab waveguide and comprising channel waveguides each having a successively increased length in a predetermined waveguide length increment;

a first portion of an output-side slab waveguide on the second substrate and connected to the channel waveguide array, wherein said second substrate comprises a cut face which is coincident with a cut face of said first portion of said output-side slab wav guide;

a second portion an output-side slab waveguide on a third substrate, wherein said third substrate comprises a cut face which is coincident with a cut face of said second portion of said output-side slab waveguide, said cut face of said second portion of said output-side slab waveguide being fixed to the cut face of said first portion of said output-side slab waveguide to form an output-side slab waveguide; and a plurality of output waveguides on the third substrate connected to the second portion of said output-side slab waveguide, wherein the second portion of said output-side slab waveguide is selectable as desired from a plurality of second portions of output-side slab waveguides which are different from each other in the number of output waveguides connected thereto.

13. An arrayed waveguide grating device comprising:

a first input waveguide and a second input waveguide on a first substrate;

a first portion of an input-side slab waveguide connected to the input waveguides and comprising a cut face which is coincident with the cut face of said first substrate;

a second portion of said input-side slab waveguide on a second substrate, wherein said second substrate comprises a cut face which is coincident with a cut face of said second portion of said input-side slab waveguide, said cut face of said second portion of said input-side slab waveguide being fixed to time cut face of said first portion of said input-side slab waveguide to form an input-side slab waveguide;

a channel waveguide array on the second substrate connected to said second portion of said input-side slab waveguide and comprising channel waveguides each having a successively increased length in a predetermined waveguide length increment;

a first portion of an output-side slab waveguide on the second substrate and connected to the channel waveguide array, wherein said second substrate comprises a cut face which is coincident with a cut face of said first portion of said output-side slab waveguide;

a second portion an output-side slab waveguide on a third substrate, wherein said third substrate comprises a cut face which is coincident with a cut face of said second portion of said output-side slab waveguide, said cut face of said second portion of said output-side slab waveguide being fixed to the cut face of said first portion of said output-side slab waveguide to form an output-side slab waveguide; and a plurality of output waveguides on the third substrate connected to the second portion of said output-side slab waveguide, wherein the second portion of said output-side slab waveguide comprises a main port connected to one of said plurality of output waveguides and a monitoring port positioned outside of said main port and connected to another of said plurality of output waveguides.

14. An arrayed waveguide grating device comprising:

a first input waveguide and a second input waveguide on a first substrate;

a first portion of an input-side slab waveguide connected to the input waveguides and comprising a cut face which is coincident with the cut face of said first substrate;

a second portion of said input-side slab waveguide on a second substrate, wherein said second substrate comprises a cut face which is coincident with a cut face of said second portion of said input-side slab waveguide, said cut face of said second portion of said input-side slab waveguide being fixed to the cut face of said first portion of said input-side slab waveguide to form an input-side slab waveguide;

a channel waveguide array on the second substrate connected to said second portion of said input-side slab waveguide and comprising channel waveguides each having a successively increased length in a predetermined waveguide length increment;

a first portion of an output-side slab waveguide on the second substrate and connected to the channel waveguide array, wherein said second substrate comprises a cut face which is coincident with a cut face of said first portion of said output-side slab waveguide;

a second portion an output-side slab waveguide on a third substrate, wherein said third substrate comprises a cut face which is coincident with a cut face of said second portion of said output-side slab waveguide, said cut face of said second portion of said output-side slab waveguide being fixed to the cut face of said first portion of said output-side slab waveguide to form an output-side slab waveguide;

a plurality of output waveguides on the third substrate connected to the second portion of said output-side slab waveguide; and a plurality of the first substrates, which are different from each other in the shape of connection of the input waveguides to the first portion of said input-side slab waveguide for selective connection to the second substrate.

15. An arrayed waveguide grating device comprising:

a first input waveguide and a second input waveguide on a first substrate;

a first portion of an input-side slab waveguide connected to the input waveguides and comprising a cut face which is coincident with the cut face of said first substrate;

a second portion of said input-side slab waveguide on a second substrate, wherein said second substrate comprises a cut face which is coincident with a cut face of said second portion of said input-side slab waveguide, said cut face of said second portion of said input-side slab waveguide being fixed to the cut face of said first portion of said input-side slab waveguide to form an input-side slab waveguide;

a channel waveguide array on the second substrata connected to said second portion of said input-side slab waveguide and comprising channel waveguides each having a successively increased length in a predetermined waveguide length increment;

a first portion of an output-side slab waveguide on the second substrate and connected to the channel waveguide array, wherein said second substrate comprises a cut face which is coincident with a cut face of said first portion of said output-side slab waveguide;

a second portion ma output-side slab waveguide on a third substrate, wherein said third substrate comprises a cut face which is coincident with a cut face of said second portion of said output-side slab waveguide, said cut face of said second portion of said output-side slab waveguide being fixed to the cut face of said first portion of said output-side slab waveguide to form an output-side slab waveguide; and a plurality of output waveguides on the third substrate connected to the second portion of said output-side slab waveguide, wherein one of said plurality of input waveguides comprises a monitoring input waveguide connected to the input waveguide portion other than a projecting portion which projects toward the input side by a length corresponding to a reduction in the slab length upon cutting of the slab waveguide into the first input-side slab waveguide and the second input-side slab waveguide or polishing of the cut faces.

* * * * *